US011674268B2

(12) United States Patent
Salciccia

(10) Patent No.: US 11,674,268 B2
(45) Date of Patent: Jun. 13, 2023

(54) RAILWAY WAGON FOR MOVING SLEEPERS

(71) Applicant: SRT SOCIETA' A RESPONSABILITA' LIMITATA CON SOCIO UNICO, Rome (IT)

(72) Inventor: Gilberto Salciccia, Rome (IT)

(73) Assignee: SRT SOCIETA' A RESPONSABILITA' LIMITATA CON SOCIO UNICO, Rome (IT)

( * ) Notice: Subject to any disclaimer, the term of this patent is extended or adjusted under 35 U.S.C. 154(b) by 42 days.

(21) Appl. No.: 16/893,887

(22) Filed: Jun. 5, 2020

(65) Prior Publication Data

US 2020/0385934 A1    Dec. 10, 2020

(30) Foreign Application Priority Data

Jun. 6, 2019   (IT) ................. 102019000008283

(51) Int. Cl.
| | |
|---|---|
| *E01B 29/06* | (2006.01) |
| *B61D 3/02* | (2006.01) |
| *B61D 3/10* | (2006.01) |
| *B61D 3/16* | (2006.01) |
| *B65G 15/10* | (2006.01) |
| *B65G 15/26* | (2006.01) |
| *B65G 37/00* | (2006.01) |
| *B65G 41/02* | (2006.01) |
| *B65G 67/22* | (2006.01) |

(52) U.S. Cl.
CPC .............. *E01B 29/06* (2013.01); *B61D 3/02* (2013.01); *B61D 3/10* (2013.01); *B61D 3/16* (2013.01); *B65G 15/10* (2013.01); *B65G 15/26* (2013.01); *B65G 37/005* (2013.01); *B65G 41/02* (2013.01); *B65G 67/22* (2013.01); *E01B 2203/146* (2013.01)

(58) Field of Classification Search
CPC ... B61D 3/16; B61D 3/02; B61D 3/10; B65G 15/26; B65G 41/02; B65G 67/22; E01B 29/06; E01B 2203/146
See application file for complete search history.

(56) References Cited

U.S. PATENT DOCUMENTS

| | | | |
|---|---|---|---|
| 3,638,577 | A | 2/1972 | Plasser et al. |
| 5,347,934 | A | 9/1994 | Dunnett |
| 2004/0045472 | A1 | 3/2004 | Therurer et al. |

(Continued)

FOREIGN PATENT DOCUMENTS

WO   2019/129678   7/2019

OTHER PUBLICATIONS

Search Report for IT201900008283, dated Feb. 14, 2020, 8 pages.

*Primary Examiner* — Saul Rodriguez
*Assistant Examiner* — Willie W Berry, Jr.
(74) *Attorney, Agent, or Firm* — Nixon & Vanderhye P.C.

(57) ABSTRACT

A railway wagon for moving sleepers including: a base structure having a platform and at least one carriage, a first conveyor carried by the platform and configured to move the sleepers along a feed direction, a second conveyor distinct from the first conveyor and also carried by the platform. The second conveyor has: a first portion extended above the platform within a lateral size of the latter, and a second portion extending outside lateral size of the platform and configured to move the sleepers outside the platform.

15 Claims, 10 Drawing Sheets

(56) References Cited

U.S. PATENT DOCUMENTS

2016/0114982 A1* 4/2016 Lichtberger .......... B65G 15/26
                                                  198/311
2017/0355385 A1* 12/2017 Aaron ................... B61D 7/00
2018/0044119 A1* 2/2018 Hoetzendorfer ....... B65G 67/24

* cited by examiner

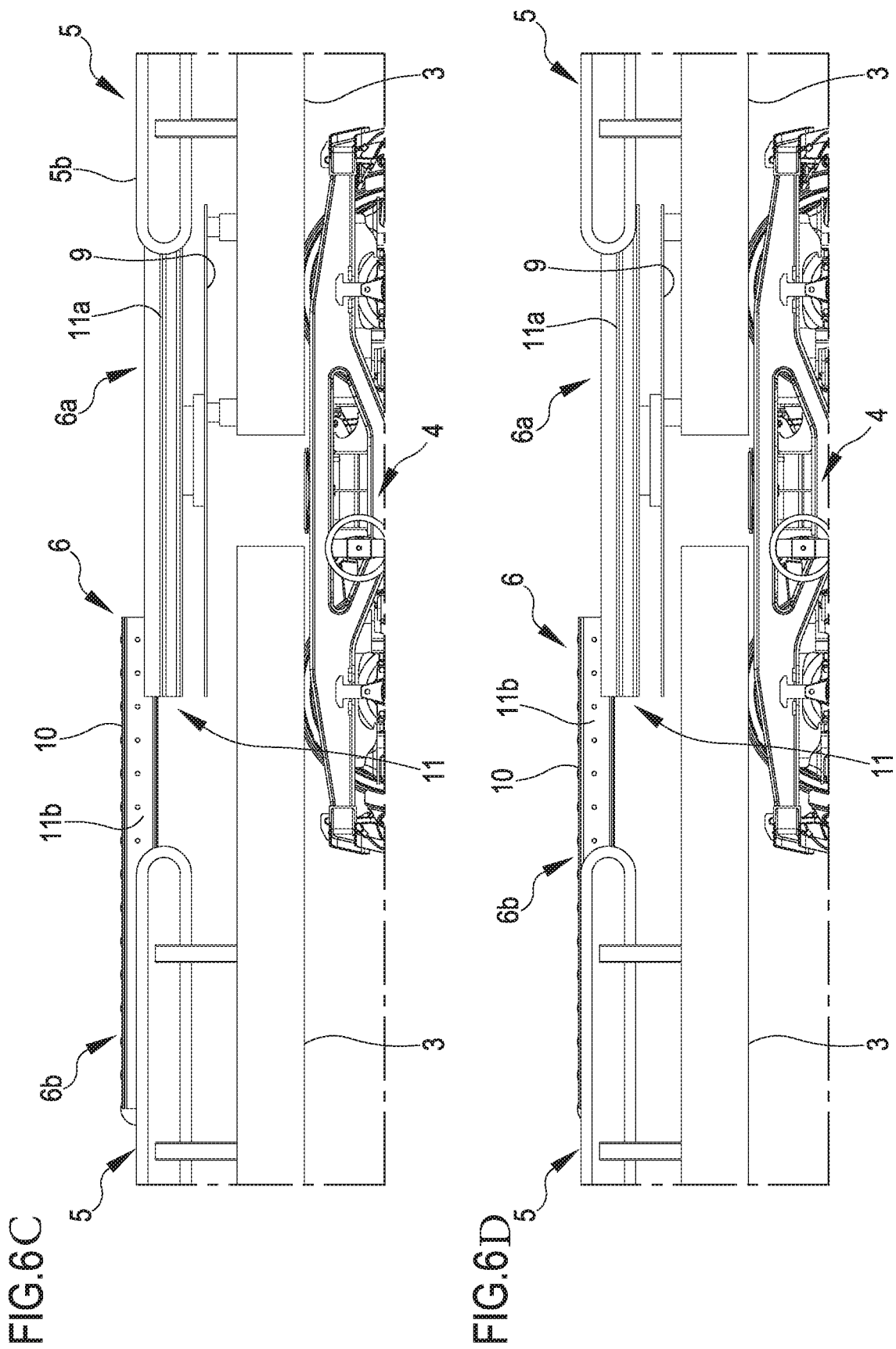

RAILWAY WAGON FOR MOVING SLEEPERS

RELATED APPLICATION

This application claims priority to Italian patent application 102019000008283 filed Jun. 6, 2019, the entirety of which is incorporated by reference.

FIELD OF THE INVENTION

The present invention may be embodied as a railway wagon for moving sleepers, also referred to as ties or cross-ties, and a railway vehicle comprising one or more of said wagons, for example connected to each other by means of an articulated joint. The invention has application in the railway field for the maintenance of railway infrastructures, for example for making and/or renovating railway lines.

BACKGROUND

Vehicles are known in the railway field for transporting equipment and materials for maintaining the railway infrastructure. For example, vehicles are known for renovating railway lines configured for transporting sleepers. Such vehicles comprise a plurality of wagons (or rolling stock) engaged with each other one after the other by means of known hooks and simultaneously axially spaced by means of bumpers; each wagon is constituted by a platform supported by a pair of carriages: the platform is configured to support a plurality of sleepers. The platform of each wagon carries a pair of rails configured to receive and allow the movement, above the platform itself, of an auxiliary conveyor: the auxiliary conveyor is configured for picking up a pre-established number of sleepers and, by means of the movement on the rails defined on the platforms, moving the sleepers from one wagon to another or from a wagon to pre-established loading/unloading stations. The auxiliary conveyor comprises a motor, independent of the motor of the wagons of the railway vehicle, which allows the auxiliary conveyor to be moved with respect to the wagons both when the vehicle is stopped and when the vehicle is moving.

A railway sleeper is a railroad tie or crosstie which is typically a rectangular support for the rails in railroad tracks. Sleepers are typically placed on the ground and perpendicular to the direction of train movement. Rails are placed on the sleepers. The sleepers transfer loads of the rails and train to the ground typically via track ballast and subgrade placed on the ground. The sleepers also hold the rails upright and maintain a constant separate between parallel rails to confirm to the gauge of a railway.

US Patent Publication 2004/045472 A1 discloses a railway vehicle for the transport of sleepers comprising a wagon constituted by a platform supported by a pair of carriages; the platform carries a plurality of conveyor belts configured to move the old sleepers from the ballast to a storage zone and a plurality of conveyor belts configured to move the new sleepers from a pick-up zone to the ballast. One or more of said belts emerges from a longitudinal end of the platform and is movable by rotation with respect to said platform only around an axis parallel to the platform: said conveyor belts can in fact be tilted towards and away with respect to the ballast or with respect to an adjacent conveyor belt.

U.S. Pat. No. 5,347,934 discloses a vehicle for moving sleepers comprising a first wagon constituted by a platform carrying a horizontal conveyor; the conveyor of the first wagon is configured to move the sleepers from a head zone to a tail zone of the wagon and to serve said sleepers to a tilted second wagon configured to lay the sleepers.

Even if the above-described solutions allow the vehicles known today to execute the renovating of railway lines, the applicant has indicated that such solutions can be improved with regard to several aspects. It is indicated that the known solutions have a structure that is poorly efficient and unsuitable for executing a quick movement of the sleepers on curvilinear sections of the railway line; in particular, the known solutions are not able to allow the correct passage of sleepers between one wagon and the next in the curvilinear sections of the railway line, thus limiting the capacity and operative efficiency of such vehicles. The applicant also indicates that a structure of the known solutions is highly bulky and has high weight; such condition enormously reduces the load capacity of each wagon, negatively affecting the rate of conveyable sleepers. It is also important to observe that the railway vehicles known today have a complex structure such to negatively affect the production costs and the costs for modification and maintenance.

SUMMARY

The present invention may be embodied to provide a railway wagon and a respective vehicle capable of efficiently and simultaneously safely moving a high number of sleepers, both when the railway vehicle is moving and when the vehicle is stopped. The present invention may be embodied to provide a railway wagon and a relative vehicle that is highly flexible in use, e.g., able to operate (travel on the rails and simultaneously move sleepers) efficiently and safely on any one railway line. Another embodiment of the present invention provides a railway wagon capable of moving railway sleepers without requiring an operator on board. Another embodiment of the present invention provides a railway wagon and a relative railway vehicle having a simple and compact structure, in particular having limited production and maintenance costs. Another embodiment of the present invention provides a railway wagon that can be easily adapted to the standard railway wagons intended for goods transport or for service uses.

The invention may be embodied as a railway wagon (1) for moving sleepers (T) is provided, comprising: a base structure (2) having: at least one platform (3), at least one carriage (4) configured to support the platform (3) and allow the movement of the base structure (2) along rails (R), at least one first conveyor (5) carried by the platform (3) and configured to move the sleepers (T) relative to said platform (3) along an advancement direction (A), wherein the railway wagon (1) comprises at least one second conveyor (6), distinct from the first conveyor (5), carried by the platform (3), said second conveyor (6) having: at least one first portion (6a) located above the platform (3) within a lateral size of the latter, said first portion (6a) of the second conveyor (6) being configured for the exchange of sleepers with the first conveyor (5), and at least one second portion (6b) extending outside the lateral size of the platform (3) and configured to move the sleepers outside said platform (3).

The platform (3) may extend longitudinally along a prevalent development direction (D) between a first and a second end portion (3a, 3b).

The conveyor (6) may be placed at the second end portion (3b) of the platform (3), the second portion (6b) of the second conveyor (6) emerging from the second end portion (3b) of the platform (3) outside the lateral size of the latter. The prevalent development direction (D) of the platform (3)

may be substantially parallel to said advancement direction (A) of the sleepers (T) on the first conveyor (5).

The first conveyor (5) may extend longitudinally along a direction parallel to the prevalent direction (D) of the platform (3). The first conveyor (5) may extends longitudinally between a first and a second end portion (5a, 5b), in which at least part of the first portion (6a) of the second conveyor (6) is flanked by at least one part of the second end portion (5b) of the first conveyor (5).

At least part of the first portion (6a) of the second conveyor (6) may be placed according to a direction orthogonal to the advancement direction (A).

At least part of the first portion (6a) of the second conveyor (6) may be placed to the side of the second end portion (5b) of the first conveyor (5).

The first conveyor (5) may comprise at least one first and at least one second movement device (7, 8) spaced apart from each along a direction orthogonal to the advancement direction (A). At least one part of the first portion (6a) of the second conveyor (6) is interposed between said first and second movement device (7, 8). The first movement device (7) may comprise at least one selected from the group between: a conveyor belt, a transport roller. The second movement device (8) may comprise at least one selected from the group between: a conveyor belt, a transport roller.

The first conveyor (5) may be entirely contained within the lateral size of the platform (3).

The second conveyor (6) may comprise at least one movement device (10) movable by rotation relative to the platform (3) around an axis transverse to said platform (3). The platform (3) may a surface for supporting first and second conveyor (5, 6) lying substantially on a plane. The second conveyor (6) may include at least one movement device (10) movable by rotation relative to the platform (3) around an axis transverse to the lying plane of the platform (3). The movement device (10) may be movable by rotation relative to the platform (3) around an axis orthogonal to said platform (3), optionally orthogonal to the lying plane of the platform (3).

The second conveyor (6) may comprise at least one base (9) fixed to the platform (3), in which the at least one movement device (10) is engaged to the base (9) and movable relative to the latter. The movement device (10) of the second conveyor (6) may be movable by rotation relative to the base around an axis transverse, optionally orthogonal, to the platform (3).

The first conveyor (5) may extend longitudinally along a development direction, the movement device (10) of the second conveyor (6) extended longitudinally along a respective development direction. The movement device (10) of the second conveyor (6) may be movable by rotation at least between: a first position in which the prevalent development direction of the movement device (10) of the second conveyor (6) is parallel to the prevalent development direction of the first conveyor (5), and a second position in which the prevalent development direction of the movement device (10) of the second conveyor (6) is tilted with respect to the prevalent development direction of the first conveyor (5).

The prevalent development direction of the movement device (10) of the second conveyor (6), in the second position, may be tilted with respect to the prevalent development direction of the first conveyor (5) by an angle greater than ±5°, optionally by an angle comprised between ±7° and ±35°. The second conveyor (6) may comprise an actuator active on the movement device (10) of the same second conveyor (6) and configured to rotate said movement device (10) from the first to the second position, and vice versa. The actuator of the second conveyor may comprise an electric motor.

The second conveyor (6) may comprise at least one guide device (11) interposed between the movement device (10) and the base (9) of the second conveyor (6), wherein said guide device (11) comprises: a fixed guide (11a) engaged with the base (9), a movable guide (11b) carrying said movement device (10) and slidably movable with respect to the fixed guide (11a) at least between: a retracted position in which the movement device (10), carried by said movable guide (11b), is placed in proximity to the first conveyor (5), and an extended position in which the movement device (10), carried by said movable guide (11b), is spaced apart from the first conveyor (5).

The fixed guide (11a) may be hinged to the base (9). The maximum distance between the movement device (10) of the second conveyor (6) and said first conveyor (5), in the extended position of the movable guide (11b), is greater than the maximum distance present between the movement device (10) of the second conveyor (6) and said first conveyor (5), in the retracted position of said movable guide (11b). The movement device (10) of the second conveyor (6), in the retracted position, may have: at least one first section placed above the platform (3) within the lateral size of the latter, and at least one second section extending outside the lateral size of the platform (3).

The movement device (10) of the second conveyor (6), in the extended position of the movable guide (11b), may extend entirely outside the lateral size of the platform (3). At least one part of the movement device (10) may define said second portion (6b) of the second conveyor. The entire movement device (10), in the extended position of the movable guide (11b), may define said second portion (6b) of the second conveyor.

The first section of the movement device (10) of the second conveyor (6), in the retracted position of the movable guide (11b), may be at least partly flanked to the first conveyor (5). The first section of the movement device (10) of the second conveyor (6), in the retracted position of the movable guide (11b), may be at least partly flanked to the second end portion (5b) of the first conveyor (5). The first section of the movement device (10) of the second conveyor (6), in the retracted position of the movable guide (11b), may be at least partly interposed between the first and second movement device (7, 8) of the first conveyor (5).

The movement device (10) of the second conveyor (6) may comprise at least one selected from the group between: a conveyor belt, a transport roller.

The second conveyor (6) may comprise an actuator active on the movable guide (11b) and configured to move said movable guide (11b) from the retracted position to the extended position, and vice versa.

The movement device (10) of the second conveyor (6) may be movable towards and away from the base (9) of the same second conveyor (6) along a direction orthogonal to the platform (3). The entire movement device (10) may be movable towards and away from the base (9) of the same second conveyor (6) along a direction orthogonal to the platform (3). The movement device (10) of the second conveyor (6) may extend substantially on a plane substantially parallel to the platform (3), optionally parallel to a lying plane of the platform. The movement device (10) of the second conveyor (6) may be movable towards and away from the base (9) along a direction orthogonal to the platform (3), remaining parallel to the platform (3).

The first and the second movement device (7, 8) of the first conveyor (5) may define a supporting surface configured to receive said sleepers (T), in which the movement device (10) of the second conveyor (6) defines a respective supporting surface configured to receive said sleepers (T), said movement device (10) of the second conveyor (6) being movable towards and away from the base (9) at least between:
- a lowered position in which the supporting surface of the movement device (10) of the second conveyor (6) is coplanar to the supporting surface of the first and second movement device (7, 8) of the first conveyor (5),
- a raised position in which the supporting surface of the movement device (10) of the second conveyor (6) is offset height wise with respect to the supporting surface of the first and second movement device (7, 8) of the first conveyor (5), optionally the supporting surface of the movement device (10) of the second conveyor (6), in the raised position, is placed at a minimum distance from the base (9) of the second conveyor (6) greater than a minimum distance present between the supporting surface of the first and second movement device (7, 8) of the first conveyor (5) and said base (9) of the second conveyor (6).

The second conveyor (6) may comprise an actuator active directly on the guide device (11) and configured to move the latter, consequently the movement device (10) of the second conveyor (6), from the lowered position to the raised position, and vice versa.

The position of the first and second movement device (7, 8) of the first conveyor (5) may be fixed with respect to the platform (3). The first and the second conveyor (5, 6) may lie substantially on a same plane and are configured for the direct exchange of sleepers (T).

The wagon may comprise at least one return conveyor (12) carried by the platform (3) and arranged above the first and of the second conveyor (5, 6) with respect to a direction orthogonal to the platform (3). The return conveyor (12) may be configured to move sleepers along a return direction (R) substantially parallel to the advancement direction (A) and in the opposite direction to the latter. The return conveyor (12) may comprise: a support frame (13), at least one movement device (14) spaced apart from the first and second conveyor (5, 6) along a direction orthogonal to the platform (3).

The movement device (14) of the return conveyor (12) may comprise at least one selected from the group between: a conveyor belt, a transport roller. The movement device (14) of the return conveyor (12) may extend along a prevalent development direction parallel to the prevalent development direction of the first conveyor (5).

The movement device (14) of the return conveyor (12) may comprise: at least one first section extending above the platform (3) within the lateral size of the latter, and at least one second section extending outside the lateral size of the platform (3).

The railway wagon may comprise at least one auxiliary conveyor (15) carried by the platform (3) and arranged opposite the second conveyor (6) with respect to the first conveyor (5). The auxiliary conveyor (15) may extend longitudinally between a first and a second end portion (15a, 15b) and is configured to move sleepers along said advancement direction (A) and for the direct exchange of sleepers with the first conveyor (5). The auxiliary conveyor (15) may extend along a prevalent development direction parallel to the prevalent development direction of the first conveyor (5). The second end portion (15b) of the auxiliary conveyor (15) may be placed flanked to, according to a direction orthogonal to the advancement direction (A), the first end portion (5a) of the first conveyor (5). The auxiliary conveyor (15) may comprise: at least one base (18) fixed to the platform (3), and at least one movement device (16) engaged with the base (18) of the same auxiliary conveyor (15) and movable relative to the latter along a pre-established direction substantially parallel to the advancement direction (A).

The auxiliary conveyor (15) may comprise at least one guide device (17) directly carrying the movement device (16) of the same auxiliary conveyor (15), wherein the guide device (17) of the auxiliary device (15) comprises: a fixed guide (17a) engaged, optionally hinged, to the base (18) of the auxiliary conveyor (15), and a movable guide (17b) carrying said movement device (16) of the auxiliary conveyor (15) and slidably movable with respect to said fixed guide (17a) at least between: a retracted position in which the movement device (16) of the auxiliary conveyor (15) has at least one end portion interposed between the first and second movement device (7, 8) of the first conveyor (5), and an extended position in which the movement device (16) of the auxiliary conveyor (15) is entirely arranged outside the first and second movement device (7, 8) of the first conveyor (5).

The maximum distance between the movement device (16) of the auxiliary conveyor (15) and said first conveyor (5), in said extended position of the movable guide (17b), may be greater than a maximum distance present between the movement device (16) of the auxiliary conveyor (15) and said first conveyor (5), in the retracted position of said movable guide (17b).

The auxiliary conveyor (15) may extend along a prevalent development direction parallel to the prevalent development direction of the first conveyor (5).

The railway wagon may comprise a collection station (20) comprising: an auxiliary platform (21), and at least one collection conveyor (22) carried by the auxiliary platform (21) and extended along a pre-established prevalent development direction, said collection conveyor (22) being configured to receive and move a pre-established number of sleepers (T) along the development direction of the same collection conveyor (22).

The collection conveyor (22) may be configured to rotate relative to the auxiliary platform (21) around an axis orthogonal to said auxiliary platform (21) at least between: a first position in which the prevalent development direction of the collection conveyor (22) is transverse with respect to the prevalent development direction of the auxiliary conveyor (15), and a second position in which the prevalent development direction of the collection conveyor (22) is parallel with respect to the prevalent development direction of the auxiliary conveyor (15).

The prevalent development direction of the collection conveyor (22), in the first position, may be tilted with respect to the prevalent development direction of the auxiliary conveyor (15) by an angle comprised between 60° and 120°, still more optionally by an angle substantially equal to 90°.

The movable guide (17b) of the auxiliary conveyor (15), in the extended position, may be configured to arrange the movement device (16) of said auxiliary conveyor (15) in an approached position with respect to the collection conveyor (22). The movable guide (17b) of the auxiliary conveyor (15), in the collected position, may be configured to arrange the movement device (16) of said auxiliary conveyor (15) in a spaced position with respect to the collection conveyor (22).

The movement device (16) of the auxiliary conveyor (15), in the extended position of the movable guide (17b) of the auxiliary conveyor (15), may have a distance from the collection conveyor (22) smaller than a distance present between said movement device (16) of the auxiliary conveyor (15) and said collection conveyor (22), in the collected portion of the movable guide (17b) of the auxiliary conveyor (15). The movement device (16) of the auxiliary conveyor (15) may be configured for exchanging sleepers (T) with the collection conveyor in the extended position of the movable guide (17b) of the auxiliary conveyor (15) and during the second position of said collection conveyor (22).

The railway wagon may comprise a stacked device (30) configured to: collect a pre-established number of sleepers (T) arriving from the return conveyor (12), and position said sleepers (T) on the auxiliary conveyor (15).

The railway wagon may comprise at least one unloading device (40) configured to: pick up the sleepers (T) arriving from the first and second conveyor (5, 6), and unload said sleepers from the railway wagon.

In a further aspect, railway vehicle (100) is provided, comprising at least one railway wagon (1) in accordance with any one of the preceding aspects.

At least one locomotive may be configured to allow the movement of the at least one railway wagon (1) along rails, wherein the railway vehicle comprises: at least one first railway wagon (1') having at least the base structure (2), at least the first conveyor (5) and at least the second conveyor (6), and at least one second railway wagon (1") engaged with the first wagon, for example by means of an articulated joint, having at least one base structure (2) and at least one first conveyor (5), wherein the second conveyor (6) of the first wagon (1') is configured to emerge from the latter up to above the second wagon (1") in order to allow the movement of sleepers from the first conveyor of the first wagon (1') to the first conveyor (5) of the second wagon (1").

The railway vehicle (100) may comprises: a first tail wagon comprising the platform, the first conveyor, the second conveyor, the auxiliary platform, the auxiliary conveyor and the collection station; a head wagon comprising the platform, the first conveyor and the unloading device; and one or more middle wagons, interposed between the tail wagon and the head wagon, comprising the platform, the first conveyor and the second conveyor.

In a further aspect, a process is provided for moving sleepers (T) by means of a railway wagon (1) in accordance with any one of the preceding aspects. The process may comprises at least one step of moving sleepers by means of the second conveyor (6) outside the lateral size of the railway wagon (1). The step of moving sleepers may comprise at least the following sub-steps: moving the sleepers along the first conveyor (5); and serving the sleepers to the second conveyor (6) by means of the first conveyor (5), the second conveyor moving the sleepers outside the lateral size of the wagon in order to allow the movement of said sleepers on a first conveyor of an adjacent railway wagon.

In a further aspect, a process is provided for moving sleepers (T) by means of a railway vehicle (100) in accordance with any one of the preceding aspects. The process may comprise at least one step of moving sleepers between at least one pair of adjacent railway wagons by means of a second conveyor of at least one of said railway wagons.

SUMMARY OF THE DRAWINGS

Several embodiments and several aspects of the finding will be described herein below with reference to the enclosed drawings, provided only as a non-limiting example in which:

FIGS. 4, 5A, 5B, 5C, 6A, 6B, 6C and 6D schematically illustrate a railway wagon during a step of moving sleepers;

DETAILED DESCRIPTION

Definitions and Conventions

It is observed that in the present detailed description, corresponding parts illustrated in the various figures are indicated with the same reference numbers. The figures could illustrate the invention by means of representations that are not in scale; therefore, parts and components illustrated in the figures relative to the object of the invention could only regard schematic representations.

Control Unit

The wagon described and claimed herein may comprise at least one control unit set to control operative conditions implemented by the same wagon and/or to control steps of the process.

The control unit may be a single unit or it may be formed of a plurality of distinct control units depending on the design selections and on the operative requirements.

With the term control unit, it is intended a component of electronic type which may comprise at least one of: a digital processor (CPU), an analog circuit, or a combination of one or more digital processors with one or more analog circuits. The control unit may be "configured" or "programmed" to perform some steps: this may be done in practice by any means that allows configuring or programming the control unit. For example, in the case of a control unit comprising one or more CPUs and one or more memories, one or more programs may be stored in suitable memory banks connected to the CPU or to the CPUs; the program or programs contain instructions which, when executed by the CPU or by the CPUs, program or configure the control unit to perform the operations described in relation to the control unit. Alternatively, if the control unit is or comprises circuitry of analog type, then the control unit circuit may be designed to include circuitry configured, in use, for processing electrical signals in a manner such to perform the steps relative to the control unit.

Actuator

With the term actuator it is intended any one device capable of causing movement on a body, for example on a command of the control unit (reception by the actuator of a command sent by the control unit). The actuator may be of an electric, pneumatic, mechanical (for example with a spring), hydraulic type, or of another type.

Railway Wagon

Figure 2:
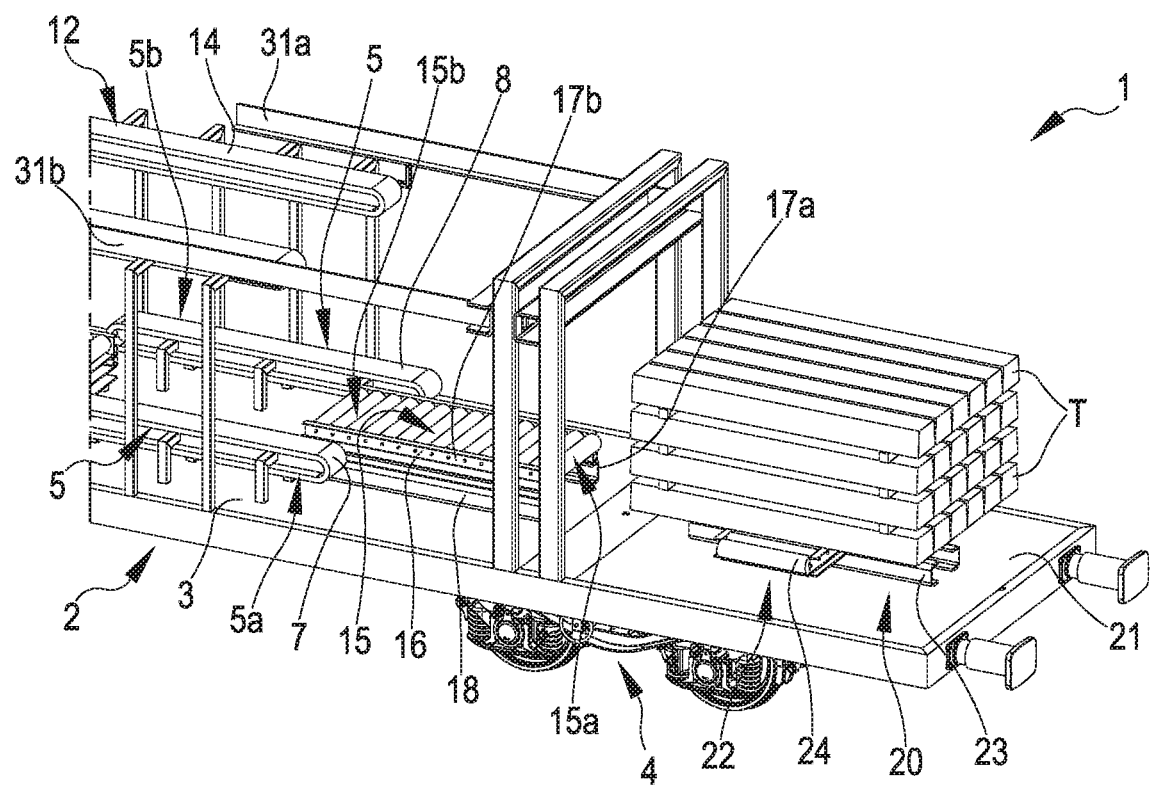
FIGS. 2 and 3 are detailed perspective views of a railway wagon during a step of loading a plurality of sleepers.
Figure 3:
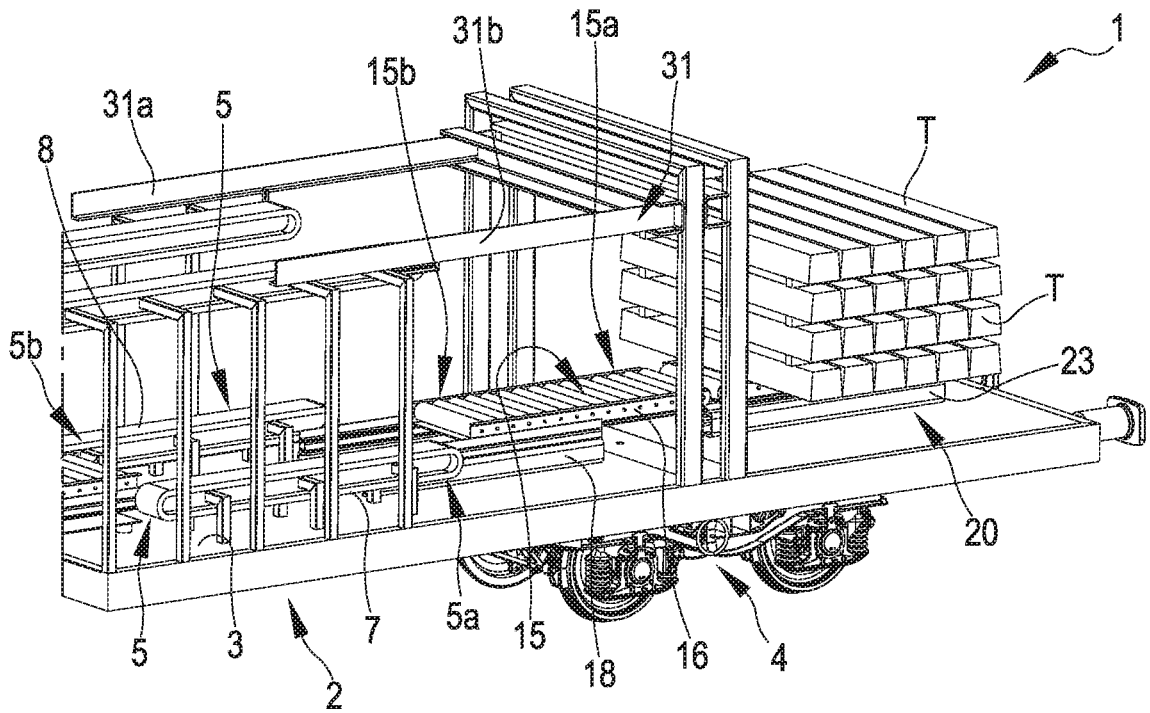
Figure 4:
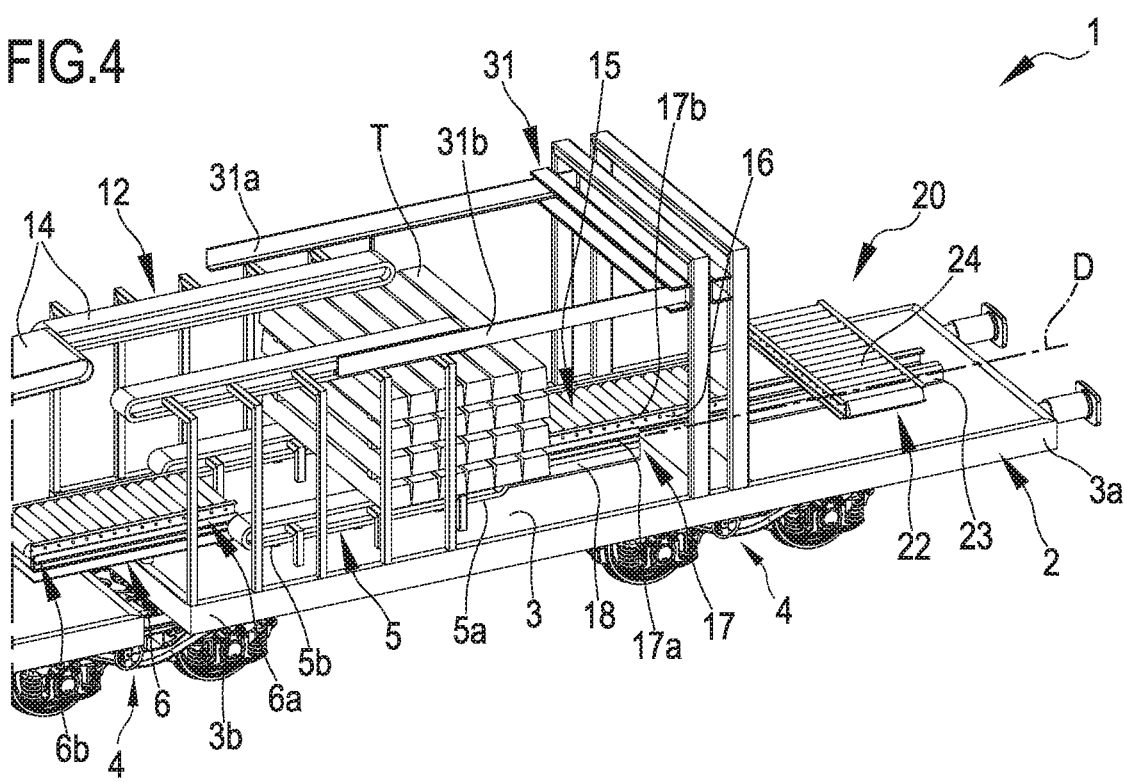

Reference number 1 overall indicates a railway wagon 1 for moving sleepers T along the railway wagon itself. The wagon 1, as shown in FIGS. 2, 3 and 4, comprises a base structure 2 having a platform 3 preferably made of metallic material, e.g. steel, extended along a substantially horizontal plane parallel to the ground. The platform 3 has a polygonal shape, in particular substantially rectangular, extended longitudinally along a prevalent development direction D (see FIG. 10) between a first end portion 3a and a second end portion 3b. The platform 3 may partially or entirely define the frame carrying of the railway wagon 1.

Figure 1:
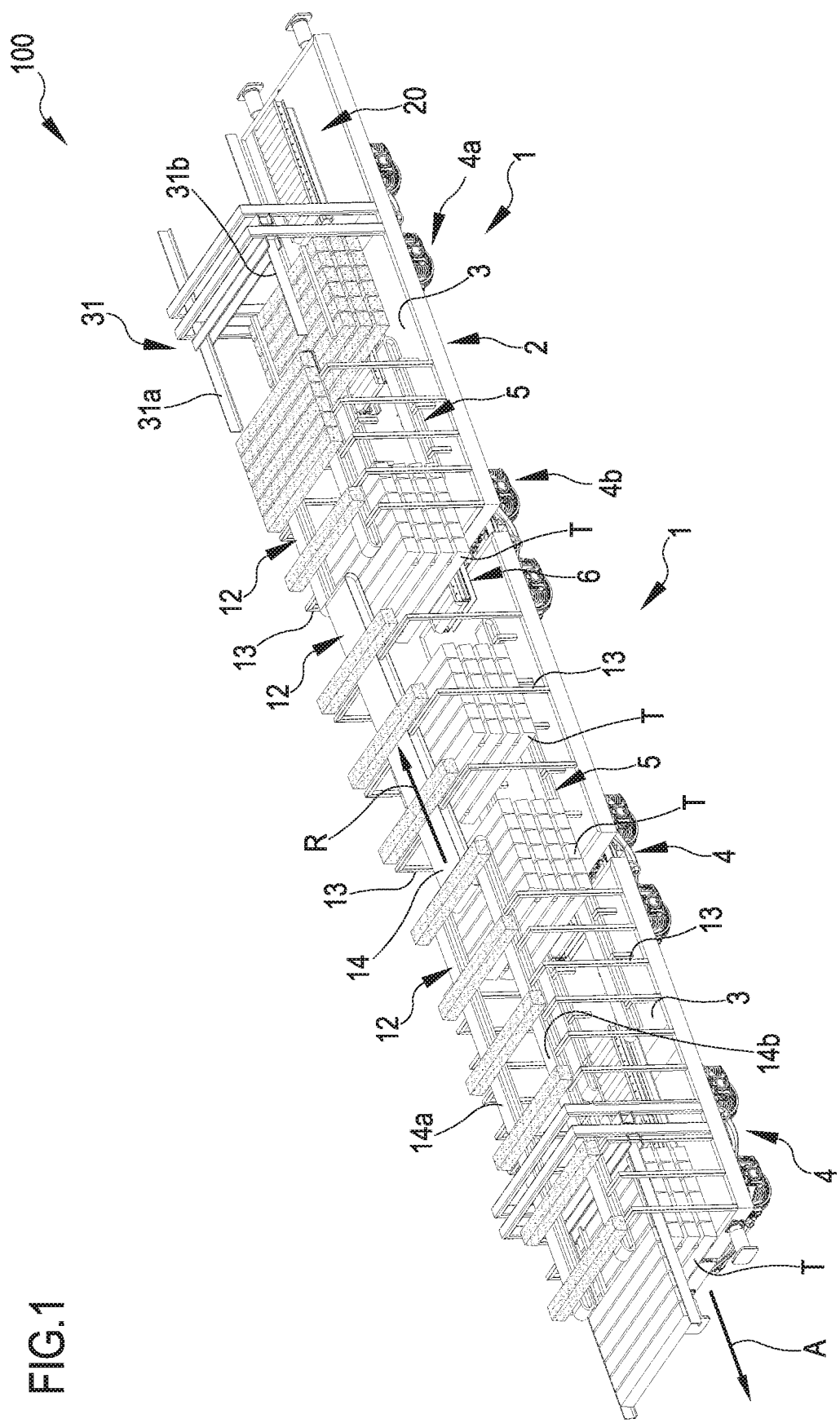
FIG. 1 is a perspective view of a railway vehicle comprising a plurality of wagons.

The base structure 2 of the railway wagon 1 comprises at least one carriage 4, arranged below the platform 3 and constrained thereto, configured to support the platform 3 and to allow the movement of the base structure 2 along rails R (not shown in the enclosed figures). In one embodiment, the base structure 2 comprises a first carriage 4a arranged entirely below the platform 3 and a second carriage 4b having a first portion arranged below the platform 3, and a second portion emerging laterally from the platform 3 and associable with a further railway wagon, such that the second carriage 4b is configured to support the platform 3 of the railway wagon 1 and with a further adjacent railway wagon as shown in FIGS. 1 and 5C. Each carriage 4 comprises at least one axle, in particular two axles, each of which comprising two railway wheels adapted for transit on rails. In particular, in the configuration in which a carriage is shared between two railway wagons, one axle of the railway wagon 1 is configured for supporting a first railway wagon 1, while the further axle of the same carriage is configured for supporting a further railway wagon. Still more particularly, as a non-limiting example of the invention, each railway wagon is supported at the longitudinal end 3a by an axle of a carriage and is supported at the opposite longitudinal end 3b by an axle of a further carriage.

The railway wagon 1 also comprises at least one first conveyor 5 carried by the platform 3 and defining a supporting surface adapted to support and move the sleepers T (also referred to as a tie or cross-tie) relative to the platform 3 along an advancement direction A as shown in detail in FIG. 4. The first conveyor 5 extends longitudinally between a first and a second end portion 5a, 5b along a direction parallel to the development direction D of the platform 3, such that the advancement direction A is parallel to the development direction D. The first end portion 5a is directed towards the first end portion 3a of the platform 3, while the second end portion 5b is directed towards the second end portion 3b of the platform 3. In one embodiment, the first conveyor 5 comprises a first and a second movement device 7, 8 spaced apart from each along a direction orthogonal to the advancement direction A and parallel to each other: in particular, the first and the second advancement device 7, 8 are spaced apart from each other and constrained in a fixed manner with respect to the platform 3. The first and the second movement device 7, 8 may comprise at least one from between a conveyor belt and a transport roller: the conveyor belt may be made of plastic material or it may be composed of a plurality of metallic meshes constrained with each other to define the belt itself. If the first conveyor 5 comprises a conveyor belt, the latter is wound as a closed ring around a pair of end rollers that are opposite each other and having rotation axes perpendicular to the advancement direction A and to the development direction D. In one embodiment, the first conveyor 5 is entirely supported by the platform 3: the first conveyor 5 does not emerge beyond a maximum lateral size of the platform 3 itself. In particular, the first conveyor is interposed between the first and the second end portion 3a, 3b and may be placed at a middle line portion of the platform 3.

The first conveyor 5, and in particular the first movement device and/or the second movement device 7, 8, comprises a drive motor 80, e.g. an electric motor, configured for determining the movement of the sleepers along the advancement direction A: in particular the drive motor 80 is connected to the conveyor belt or to the roller in order to determine the movement thereof. Optionally the motor may cause the movement of the sleepers T, when arranged on the first conveyor 5, in both directions along the direction A.

In one embodiment, the first conveyor 5 is fixed with respect to the platform 3: however, it is also possible to provide for a first conveyor 5 that is vertically movable towards or away from the platform 3.

The railway wagon 1 also comprises at least one second conveyor 6, distinct from the first conveyor 5, carried by the platform 3 and arranged at the second end portion 3b of the platform 3. The second conveyor extends lengthwise between a first portion 6a, located above the platform 3 within a lateral size of the latter and configured for the exchange of sleepers with the first conveyor 5, and a second portion 6b extending outside lateral size of the platform 3 and configured to move the sleepers outside the platform 3. In particular, as shown in detail in FIG. 4, the second portion 6b of the second conveyor 6 emerges from the second end portion 3b of the platform 3 outside the lateral size of the latter. The second conveyor 6 extends starting from the second end portion 5b of the first conveyor 5 in a manner such that at least part of the first portion 6a of the second conveyor 6 is placed flanked by at least one part of the second end portion 5b of the first conveyor 5. In more detail, as shown in the top view of FIG. 5B, the first portion 6a of the second conveyor 6 is interposed between the end portions of the first and of the second movement device 7, 8, to define a superimposition section in which one or more sleepers T may be supported both by the second end portion 5b of the first conveyor 5, and by the first end portion 6a of the second conveyor 6. The first and the second conveyor 5, 6 are configured for the direct exchange of sleepers, from the first to the second conveyor: the superimposition section allows a fluid exchange of the sleepers between the first and the second conveyor 5, 6 and vice versa, in a manner such to prevent a delay in the movement of the sleepers T during such exchange.

In one embodiment, the second conveyor 6 is movable by rotation with respect to the platform 3 of the railway wagon 1 around an axis substantially perpendicular to the platform 3, in which such axis may be arranged at the second end portion 3b above the platform 3 or emerge outside the second end portion 3b. The second conveyor 6 comprises a base 9 fixed to the platform 3, and a movement device 10 engaged with the base 9 and movable with respect to the latter around such rotation axis, as shown in the top view of FIGS. 5A and 5B and in detail in FIG. 6C. The base 9 may be defined by a plate, made for example of metallic material such as steel, and firmly constrained to the platform 3 by means of bolted coupling or welding. The base 9 is constrained to the second end portion 3b of the platform 3 and emerge in away from the second end portion 3b of the platform 3: in other words, the base 9 acts as support and anchorage for the movement device 10, which in turn defines a support surface for the sleepers T, allowing the movement thereof along the prevalent development direction of the second conveyor 6. The device 10 of the second conveyor 6 may comprise at least one from between a conveyor belt and a transport roller: the conveyor belt may be made of plastic material or it may be composed of a plurality of metallic meshes constrained with each other to define the belt itself. If the second conveyor 6 is a roller, it may comprise a plurality of rollers, each movable by rotation around a rotation axis arranged parallel to each other to define a supporting surface movable for the sleepers T. The rollers are preferably made of metallic material, such as steel, or of plastic or composite material.

The second conveyor 6, and in particular the movement device 10 of the second conveyor 6, comprises a drive motor, e.g. an electric motor, configured to determine the movement of the sleepers T along the prevalent development direction of the second conveyor 6: in particular the drive motor is connected to the conveyor belt or to the roller in order to cause the movement thereof. Optionally the motor may cause the movement of the sleepers T in both directions along the prevalent development direction of the conveyor 6. The motor is connected to the conveyor belt or to the roller by means of gears or by means of belt or chain: optionally a reducer may be interposed between the drive motor and the movement device 10.

The movement device 10 of the second conveyor 6 is movable by rotation with respect to the platform 3 and with respect to the first conveyor 5: in particular, the movement device 10 is movable between a first position in which the prevalent development direction thereof is parallel to the prevalent development direction of the first conveyor 5, and a second position in which the prevalent development direction thereof is angularly tilted with respect to the prevalent development direction of the first conveyor 5. Such tilt may be in clockwise or anti-clockwise direction and in particular has an angle greater than ±5°, and in particular comprised between ±7° and ±35°.

The second conveyor 6, and in particular the movement device 10, comprises a rotation actuator on the movement device 10 of the same second conveyor 6 and configured for causing a rotation thereof the axis thereof from the first to the second position, and vice versa. The rotation actuator may be an electric motor or a hydraulic actuator activated by a pressurized fluid.

The movement device 10 defines a substantially horizontal supporting surface configured to receive in abutment the sleepers T during an operative condition of the railway wagon 1, in which such surface is parallel to a support surface defined by the first conveyor 5: the supporting surface of the movement device 10 of the second conveyor 6 is parallel to the platform 3 of the railway wagon 1.

Figure 6A:
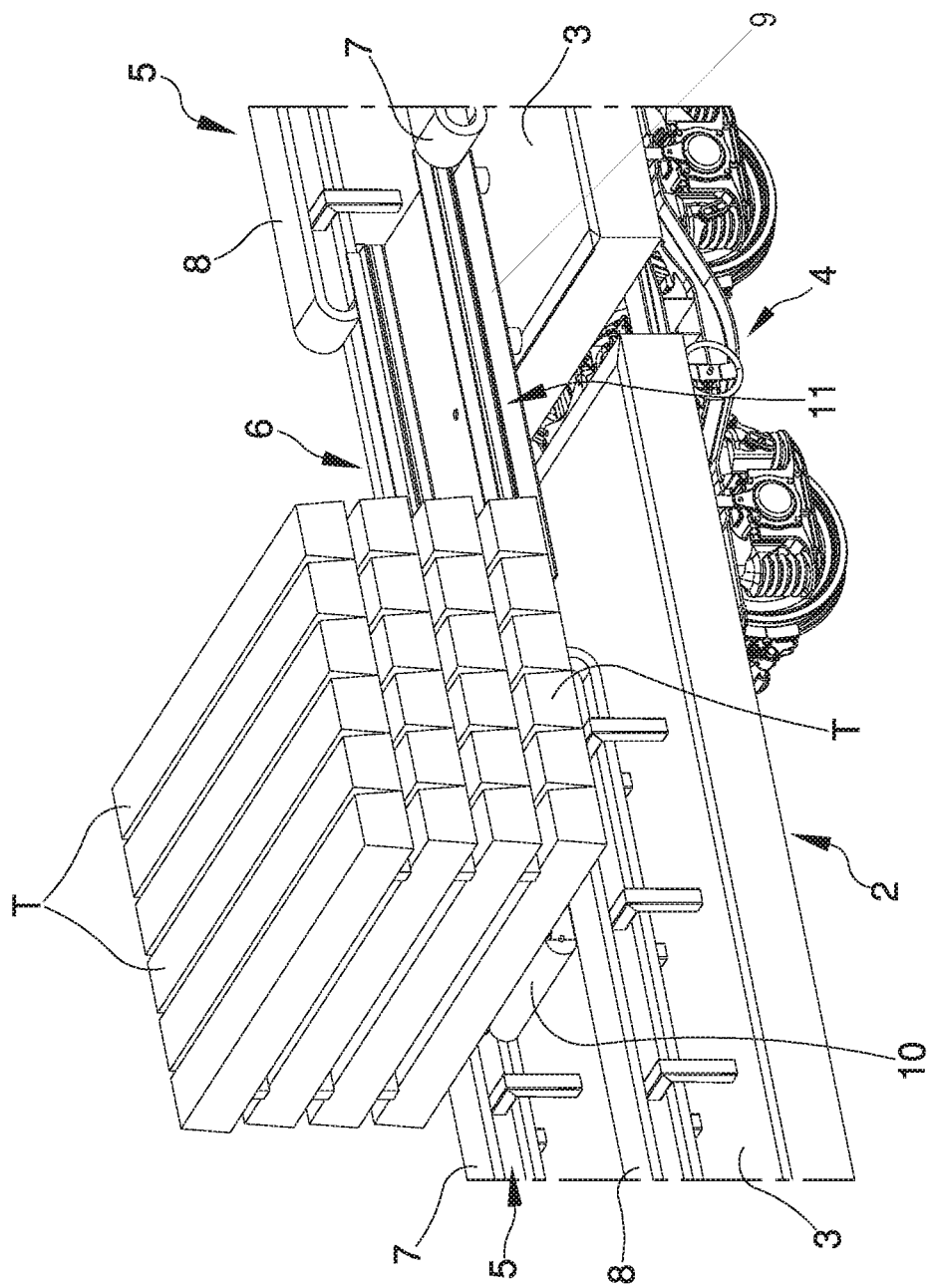
Figure 6B:
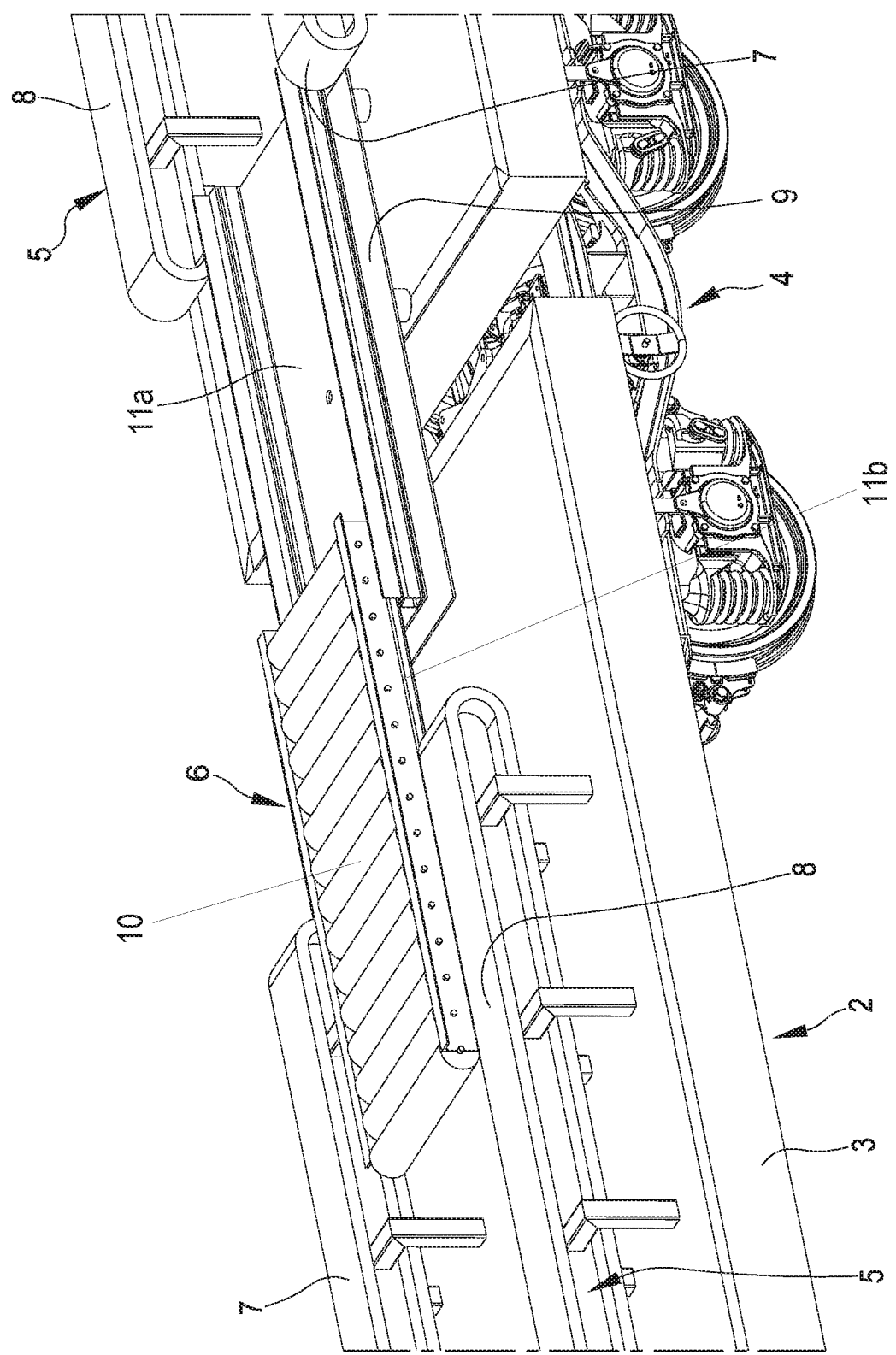

Furthermore, the movement device 10 of the second conveyor 6 may be vertically movable along an axis substantially perpendicular to the platform 3 towards and away from the base 9, optionally from the platform 3, between a raised position and a lowered position, as shown respectively in FIGS. 6B and 6C, and vice versa. In the lowered position, shown in FIG. 6D, the supporting surface of the movement device 10 of the second conveyor 6 is coplanar to the supporting surface of the first and second movement device 7, 8 of the first conveyor 5. On the other hand, in the raised position shown in FIG. 6C, the supporting surface of the movement device 10 of the second conveyor 6 is offset height wise with respect to the supporting surface of the first and second movement device 7, 8 of the first conveyor 5. The supporting surface of the movement device 10 of the second conveyor 6, when arranged in the raised position, is placed at a height, measured along an axis perpendicular to such supporting surface, greater than a respective height level of the supporting surface of the first and second movement device 7, 8 of the first conveyor 5: in other words the supporting surface of the movement device 10 of the second conveyor 6 is placed, when in the raised position (see FIG. 6C), at a height greater than the supporting surface of the first and second movement device 7, 8 of the first conveyor 5. The second conveyor 6, when arranged in the raised position, allows supporting the sleepers T above the first conveyor 5 at the superimposition section without the sleepers T themselves contacting the first or with the second movement device 7, 8 of the first conveyor 5.

The second conveyor 6 comprises, if the device 10 is vertically movable, a lifting actuator or a motor configured to cause the movement of the movement device 10 of the second conveyor 6 from the raised position to the lowered position and vice versa. The lifting motor may for example be an electric motor or a hydraulic or electric actuator.

In one embodiment, the movement device 10 of the second conveyor 6 is slidably movable along a direction substantially parallel to the platform 3 between a retracted position (see FIGS. 5B and 5C) in which the movement device 10 is placed in proximity to the first conveyor 5 and interposed between the first and the second movement device 7, 8, and an extended position (see FIGS. 6A, 6B, 6C and 6D) in which the movement device 10 is spaced apart from the first conveyor 5. In more detail, the second conveyor 6 comprises, as shown in detail in the side view of FIG. 6C, a guide device 11, interposed between the movement device 10 and the base 9, comprising a fixed guide 11a engaged with the base 9 by means of a constraint of hinge type, and a movable guide 11b carrying the movement device 10 and slidably movable with respect to the fixed guide 11a between the retracted position and the extended position, and vice versa. In other words, such guide allows the extension and the contraction of the movement device 10, which, when arranged in the retracted position has at least one first section placed above the platform 3 within the lateral size of the latter, and at least one second section extending outside lateral size of the platform 3. In detail, the movement device 10, when arranged in the retracted position, has the first section flanked to, and in particular interposed between, the first and the second movement device 7, 8 of the first conveyor 5, in a manner such to allow the exchange of the sleepers between the first and the second conveyor 5, 6. The movement device 10, when instead arranged in the extended position, extends entirely outside the lateral size of the platform 3. The second conveyor 6 comprises an extension motor/actuator 84 active on the guide 11 and configured to move the movable guide 11b from the retracted position to the extended position, and vice versa.

Figure 5A:
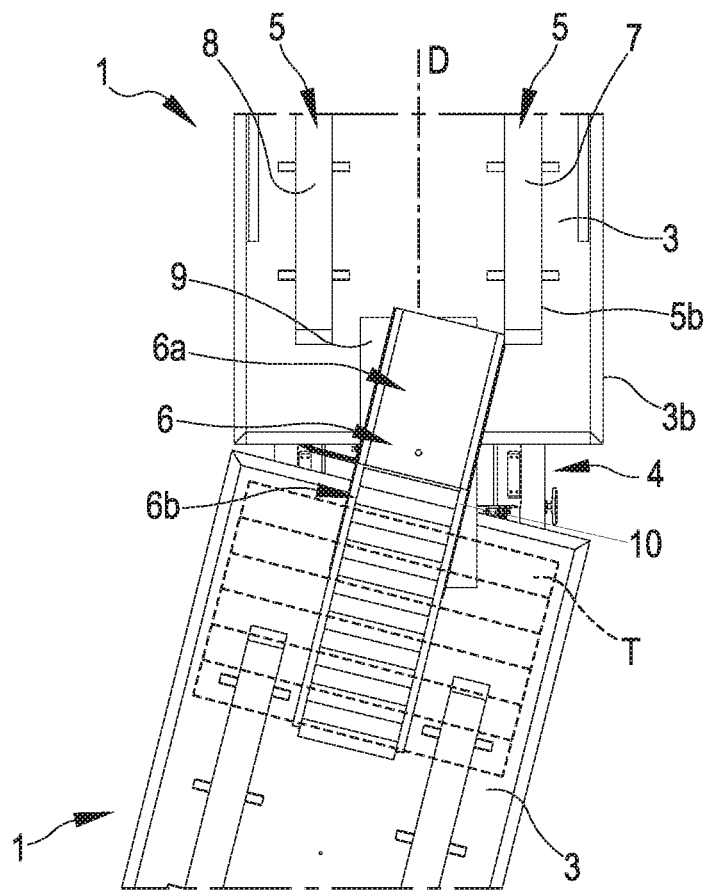
Figure 5B:
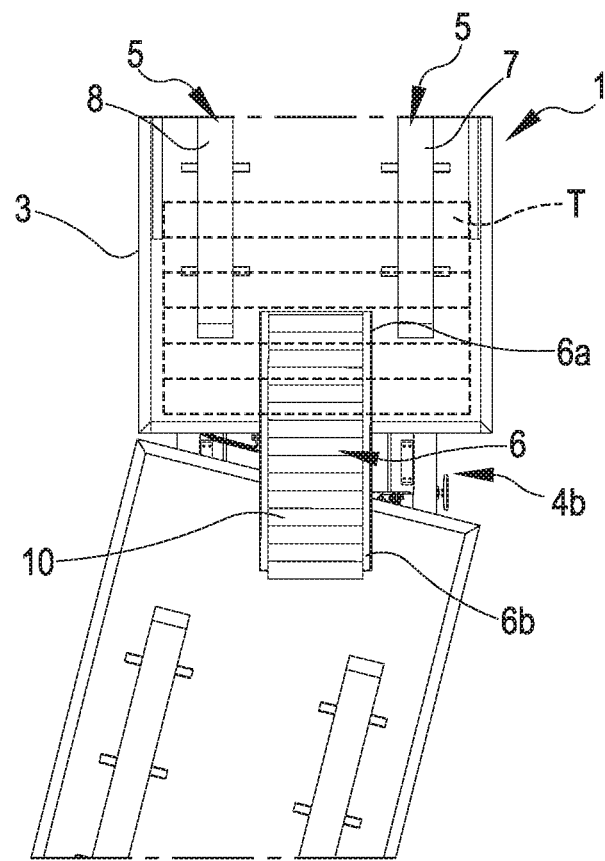
Figure 5C:
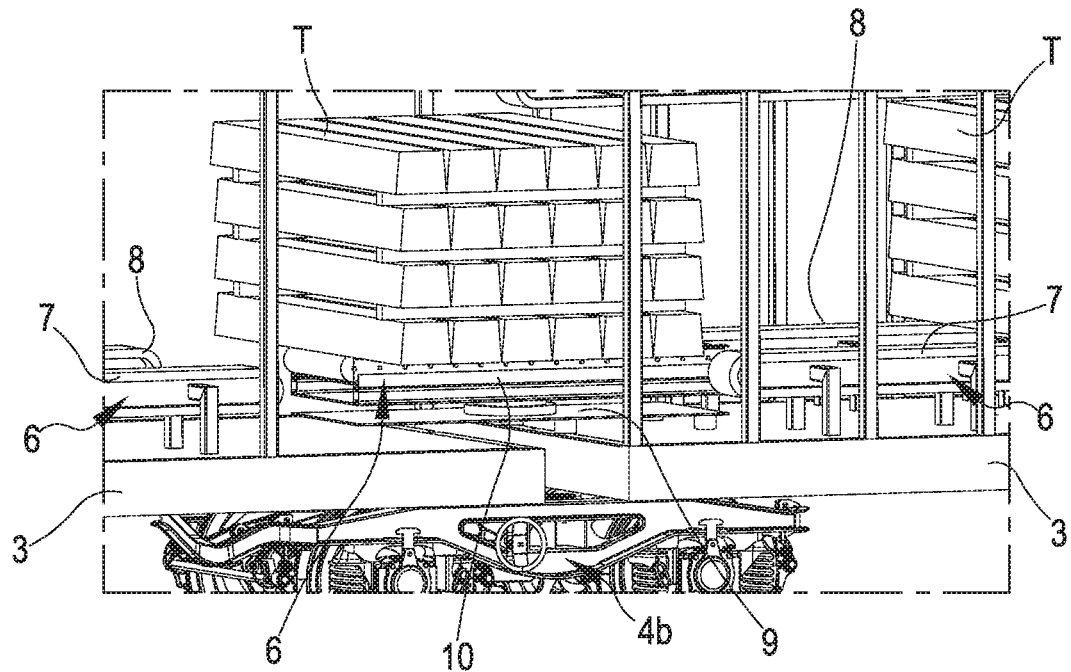

As will be better described herein below in the section regarding a railway vehicle 100, the railway wagon 1 is connectable to a further adjacent railway wagon for example by means of an articulated joint; the further wagon may be in accordance with the above-described wagon 1 and comprise at least the first conveyor 5 as shown in FIGS. 4, 5A, 5B and 5C. The second conveyor 6 of the railway wagon 1 allows, in particular when arranged in the extended position thereof, the exchange of the sleepers T between the railway wagon 1 and the further railway wagon, defining a bridge of exchange between the railway wagon 1 and the further railway wagon. When the railway wagon 1 and the further railway wagon are arranged at a curve, the respective platforms are arranged along directions transverse to each other, as shown in FIGS. 5A and 5B: in this circumstance, the railway wagons are not aligned with each other along a same direction. The second conveyor 6, due to the possibility of extension and contraction of the movement device 10 and to the degree of rotational freedom of the latter, allows transferring the sleepers T between two railway wagons even when these are tilted with respect to each other. In particular, due to the rotation freedom of the device 10, the latter may be angularly aligned with the railway wagon on which the sleepers are arranged, as visible in FIG. 5A, the movement device 10 is initially aligned with the wagon 1 carrying the sleepers; following the passage of the sleepers on the adjacent wagon, the movement device may be angularly aligned with the latter as shown in FIG. 5B. In particular, with angular alignment it is intended the alignment between the development direction of the device 10 and the longitudinal development direction of the railway wagon. In this manner, the movement device 10 is capable of positioning the sleepers on the conveyors of the railway wagons exactly in the direction orthogonal to the advancement direction of the sleepers (see FIGS. 1, 4-5B, 6 and 7).

The railway wagon 1 may comprise an angular sensor configured to emit a signal representative of the tilt between the railway wagon and the further railway wagon in a manner such to be able to manage the tilt of the movement device 10 so that the same may be adjusted as a function of the angular position of the conveyors of the single wagons 1.

The railway wagon may comprise an auxiliary conveyor 15, shown in FIGS. 2-4, 10 and 11, carried by the platform 3 and arranged opposite the second conveyor 6 with respect to the first conveyor 5 at the first end portion 3a of the platform 3. The auxiliary conveyor 15 extends longitudinally between a first and a second end portion 15a, 15b, in which the first end portion 15a is directed towards the first end portion 3a of the platform 3, while the second end portion 15b of the auxiliary conveyor 15 is directed towards the first end portion 5a of the first conveyor 5. In other words, the auxiliary conveyor 15 is at least partially interposed between the first end portion 3a of the platform 3 and the first end portion 5a of the first conveyor 5, and is configured to move sleepers T along the advancement direction A and for the direct exchange of sleepers T with the first conveyor 5.

The auxiliary conveyor 15 extends between the first and the second end portion 15a, 15b along a prevalent development direction parallel to the prevalent development direction of the first conveyor 5: in particular the auxiliary conveyor 15 extends parallel to the prevalent development direction D of the platform 3, such that the first conveyor 5, the platform 3 and the auxiliary conveyor 15 are parallel to each other and preferably arranged along a same axis coinciding with the prevalent development direction D and with the advancement direction A.

The auxiliary conveyor 15 comprises a base 18 fixed to the platform 3, and a movement device 16 defining a supporting surface adapted to support the sleepers T and allow the movement along the advancement direction A. The device 16 of the auxiliary conveyor 15 may in particular comprise at least one from between a conveyor belt and a transport roller, in which the conveyor belt may be made of plastic material or may be composed of a plurality of metallic meshes constrained to each other to define the belt itself. The conveyor 15 shown in FIG. 10 comprises a roller, having a plurality of rollers, each movable by rotation around a rotation axis thereof and arranged parallel to each other to define a supporting surface movable for the sleepers T. The rollers are preferably made of metallic material, such as steel, or of plastic or composite material.

The auxiliary conveyor 15, and in particular the movement device 16 of the auxiliary conveyor 15, comprises a drive motor, for example an electric motor, configured to cause the movement of the sleepers T along the prevalent development direction D of the platform 3: in particular the drive motor is connected to the conveyor belt or to the roller in order respectively cause the movement or the rotation thereof. Optionally the motor may cause the movement of the sleepers T in both directions along the advancement direction A.

The movement device 16 is engaged to the base 18 and is movable with respect to the latter along a pre-established direction substantially parallel to the advancement direction A and/or to the prevalent development direction D of the loading platform 3, between a retracted position, shown in FIG. 2, and an extended position, shown in FIG. 3. In the retracted position, the movement device 16 of the auxiliary conveyor 15 has an end portion flanked to, and in particular interposed between, the first end portion 3a of the first and second movement device 7, 8 of the first conveyor 5, to define a superimposition section, while in the extended position the movement device 16 of the auxiliary conveyor 15 is entirely arranged outside the first and second movement device 7, 8 of the first conveyor 5. In particular, the maximum distance between the movement device 16 of the auxiliary conveyor 15 and the first conveyor 5, when in the extended position, is greater than a maximum distance present between the movement device 16 of the auxiliary conveyor 15 and the first conveyor 5 when the auxiliary conveyor is in the retracted position. In other words, the movement device 16 of the auxiliary conveyor 15 is movable towards and away the first conveyor 5 along a direction substantially parallel to and coinciding with the prevalent development direction D of the platform 3 and with the advancement direction A of the sleepers T. In more detail the auxiliary conveyor 15 comprises a guide device 17, directly carrying the movement device 16, comprising a fixed guide 17a engaged with the base 18 of the auxiliary conveyor 15 (e.g. fixed to the base 18 or constrained by means of a constraint of sliding block or hinge type), and a movable guide 17b carrying the movement device 16 of the auxiliary conveyor 15 and slidably movable with respect to the fixed guide 17a between the retracted position and the extended position, and vice versa. The auxiliary conveyor 15 may comprise an extraction motor/actuator, e.g. electric or pneumatic, configured to cause the movement of the movement device 16 of the auxiliary conveyor 15 from the retracted position to the extended position and vice versa.

In the embodiment shown in the enclosed figures, the auxiliary conveyor 15 does not have a degree of rotational freedom with respect to the platform 3: in other words, the prevalent development direction of the auxiliary conveyor 15 is fixed and parallel to the prevalent development direction D of the platform 3. Nevertheless, it is possible to provide for an auxiliary conveyor 15 movable by rotation around an axis substantially perpendicular to the platform 3. In such case, the auxiliary conveyor may be idle in rotation around the rotation axis thereof or it may comprise one or more actuators or motors configured to cause the rotation thereof.

Furthermore, the movement device 16 of the auxiliary conveyor 15 may be vertically movable along an axis substantially perpendicular to the platform 3 towards and away from the base 18, optionally from the platform 3, between a raised position and a lowered position and vice versa: such embodiment is not shown in the enclosed figures. In the lowered position the supporting surface of the movement device 16 of the auxiliary conveyor 15 is coplanar to the supporting surface of the first and second movement device 7, 8 of the first conveyor 5, while in the raised position the supporting surface of the movement device 16 of the auxiliary conveyor 15 is offset height wise with respect to the supporting surface of the first and second movement device 7, 8 of the first conveyor 5. The supporting surface of the movement device 16 of the auxiliary conveyor 15, when arranged in the raised position, is placed at a height, measured along an axis perpendicular to such supporting surface, greater than a respective height of the supporting surface of the first and of the second movement device 7, 8 of the first conveyor 5. In other words, the supporting surface of the movement device 16 of the auxiliary conveyor 15 is placed, when in the raised position, at a height greater than the supporting surface of the first and second movement device 7, 8 of the first conveyor 5. The auxiliary conveyor 15, when arranged in the raised position, allows carrying the sleepers T above the first conveyor 5 at the superimposition section without the sleepers T contacting the first or the second movement device 7, 8 of the first conveyor 5. The auxiliary conveyor 15 may comprise a lifting motor/actuator, e.g. electric or pneumatic, configured for causing the movement of the movement device 16 of the auxiliary conveyor 15 from the lowered position to the raised position and vice versa.

In one embodiment, the railway wagon may comprise a return conveyor 12, e.g. shown in FIGS. 1 to 4 and 8 to 11, configured to move sleepers along a return direction R substantially parallel to the advancement direction A and in the opposite direction to the latter. The return conveyor 12 is carried by the platform 3 and arranged above the first and of the second conveyor 5, 6 with respect to a direction orthogonal to the platform 3 at a distance from the first and/or from the second conveyor.

The return conveyor 12 comprises at least one movement device 14 spaced apart from the first and second conveyor 5, 6 along a direction orthogonal to the platform 3, and extended along a prevalent development direction parallel to the prevalent development direction D of the platform 3, in more detail, parallel to the prevalent development direction of the first conveyor 5. The movement device 14 of the return conveyor 12 is then vertically aligned and raised with respect to the first and second conveyor 5, 6.

The return conveyor 12, and in particular the movement device 14, comprises a transport roller or a conveyor belt connected to a drive motor, in particular an electric motor, configured to cause the movement thereof along the return direction R. In one embodiment, the movement device 14 of the return conveyor 12 emerges outside the lateral size of the platform 3 at the first and/or second end portion 3*a*, 3*b* in order to allow the transit of sleepers between two adjacent railway wagons. The return conveyor 12 may comprise a single movement device 14 (see central railway wagon 1 of FIG. 1) or a first and a second movement device 14*a*, 14*b* (see end railway wagons 1 of FIG. 1). The return conveyor 12 comprises a support frame 13, made of metallic material such as steel, adapted to support the movement devices 14 above the first and second conveyors 5, 6. The support frame 13 comprises a plurality of lateral columns emerging height wise from an end portion of the platform 3 in manner substantially perpendicular to the latter, and a plurality of crosspieces extended parallel to the platform 3 to support the movement device 14, in which each crosspiece is constrained to said plurality of columns. In other words, the support frame 13 defines a load-bearing structure having substantially C shape.

The railway wagon 1 also comprises a stacked device 30 configured to receive a predetermined number of sleepers T arriving from the return conveyor 12, and move them from the return conveyor 12 to the auxiliary conveyor 15. The stacked device 30 has a grip device 31 movable for translation between an extended position shown in FIGS. 9 and 11, in which it is placed flanked to the return conveyor 12 and configured to receive and support the sleepers T arriving from the return conveyor 12, and a retracted position shown in FIG. 10. In particular, the grip device 31 comprises a first and a second grip device 31*a*, 31*b* substantially parallel to each other and extended along a direction substantially parallel to the return direction R of the sleepers T: in particular the first and the second grip device 31*a*, 31*b* define a pair of arms extended along a main direction substantially parallel to the prevalent development direction of the movement device 14 of the return conveyor 12. The first and the second grip device 31*a*, 31*b* are spaced apart from each other and arranged at the margins of the maximum lateral size defined by the platform 3. When the stacked device 30 is in the extended position, an end portion of the movement device 14 of the return conveyor 12 is interposed between the first and the second grip device 31*a*, 31*b*, such that, in at least one operative condition, the sleepers T are simultaneously carried by the movement device 14 of the return conveyor 12 and by the grip device 31. In the retracted position, however, the grip device 31 is not superimposed on the movement device 14 of the return conveyor 12, such that the sleepers T are arranged outside a vertical size of the movement device 14 of the return conveyor 12 and only supported by the grip device 31.

The stacked device 30, and in particular the grip device 31, is also vertically movable along a direction substantially perpendicular to the platform 3, between a lowered position in which the stacked device is close to the platform 3, and a raised position in which the stacked device 30 is placed flanked to the movement device 14 of the return conveyor 12. In more detail, the grip device 31 defines a support surface for the sleepers T, which is substantially coplanar to the movement device 14 of the return conveyor 12 when the grip device 31 is in the raised position, and substantially coplanar to the movement device 16 of the auxiliary conveyor when the grip device 31 is in the lowered position. In other words the stacked device 30 is configured to receive a predetermined number of sleepers T arriving from the movement device 14 of the return conveyor 12, moving them from the extended position to the retracted position of the grip device 31 so as to remove them from the movement device 14 of the return conveyor 12, and subsequently move them from the raised position to the lowered position of the stacked device 30 in order to arrange such predetermined number of sleepers T on the movement device 16 of the auxiliary conveyor 15.

The stacked device may comprise an extraction motor connected to the grip device 31 and configured to cause the movement thereof between the retracted position and the extended position and vice versa, and a lifting motor connected to the grip device 31 and configured to cause the movement thereof between the lowered position and the raised position and vice versa.

In one embodiment, the railway wagon 1 may comprise a collection station 20, shown in FIGS. 1 to 4 and 10, 11, comprising an auxiliary platform 21 carrying a collection conveyor 22, the latter extended along a pre-established prevalent development direction and adapted to receive, support and move a predetermined number of sleepers T along the development direction thereof. The auxiliary platform 21 preferably emerges from the first end 3*a* of the platform 3 of the railway wagon along the prevalent development direction of the platform 3 and is substantially coplanar to the platform 3.

The collection conveyor 22 comprises a movement device 24 defining a supporting surface adapted to support the sleepers T and allow the movement thereof along a prevalent development direction thereof. The movement device 24 has at least one between a conveyor belt and a transport roller, in which the conveyor belt may be made of plastic material or it may be composed of a plurality of metallic meshes defining the belt itself.

The movement device 24 of the collection conveyor 22 comprises a drive motor, e.g. an electric motor, configured to cause the movement of the sleepers T along the prevalent development direction of the movement device 24: in particular, said drive motor is connected to the conveyor belt or to the roller in order to respectively cause the movement or the rotation thereof. Optionally the motor may cause the movement of the sleepers T in both directions.

Figure 10:
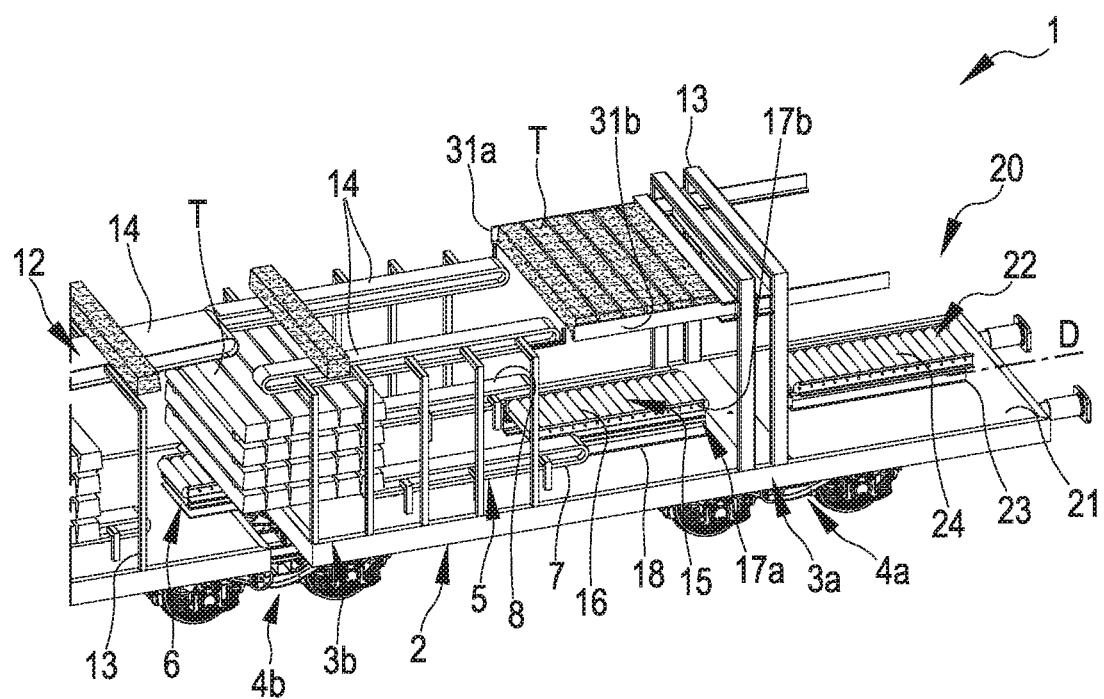
Figure 11:
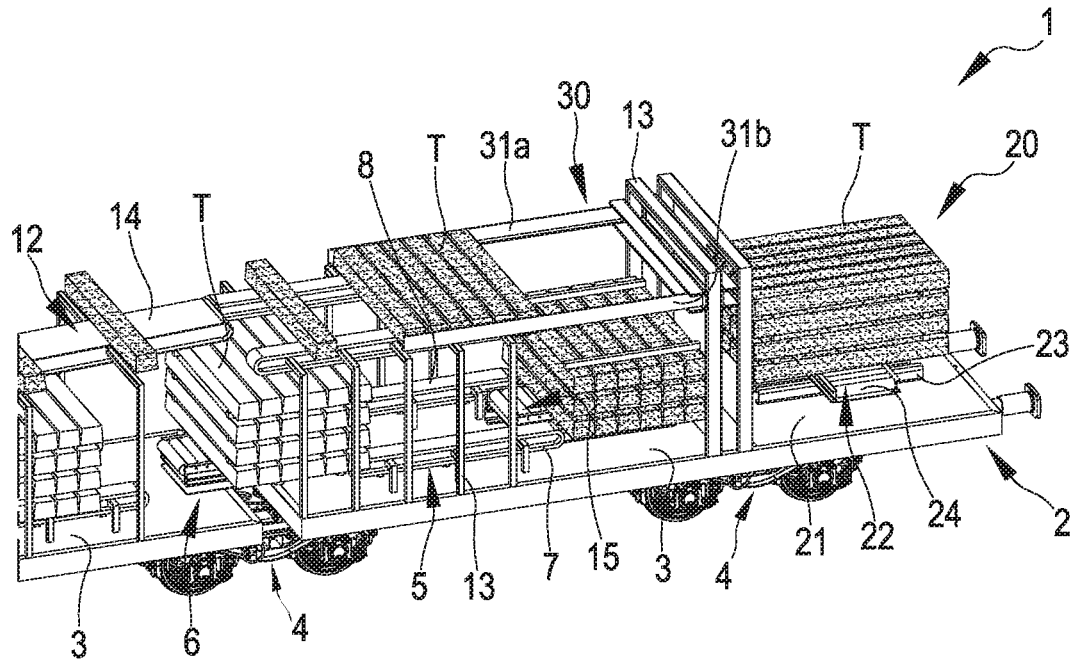

The collection conveyor 22 is configured to rotate relative to the auxiliary platform 21 around an axis orthogonal to the auxiliary platform 21 itself between a first position and a second position. In the first position, the prevalent development direction of the collection conveyor 22, and in particular of the movement device 24, is transverse with respect to the prevalent development direction of the auxiliary conveyor 15 or with respect to the prevalent development direction of the first conveyor 5, while in the second position the prevalent development direction of the collection conveyor 22 is parallel with respect to the prevalent development direction of the auxiliary conveyor 15 or with respect to prevalent development direction of the first conveyor 5. In other words, in the second position the collection conveyor 22 is aligned with the first conveyor 5 and with the auxiliary conveyor 15, while in the first position the collection conveyor 22 is tilted with respect to the auxiliary conveyor 15 or to the first conveyor 5 by an angle comprised between 60° and 120°, more precisely by an angle substantially equal to 90° (see FIG. 4). The collection conveyor 22 comprises a base 23 fixed to the auxiliary platform 21, and carrying the movement device 24, in which the latter is movable with respect to the latter around a rotation axis, as shown in FIGS. 10 and 11. The base 9 may be defined by a plate, for example made of metallic material such as steel and firmly constrained to the auxiliary platform 21 by means of bolted coupling or welding. The collection conveyor 22 may comprise a rotation motor 92 connected to the movement device 24 and configured to cause the rotation thereof between the first and the second position and vice versa.

The collection conveyor 22 may also comprise a guide device, not shown in the enclosed figures, interposed between the movement device 24 and the base 23, comprising a fixed guide fixed to the base 23, and a movable guide carrying the movement device 24 and slidably movable with respect to the fixed guide between a retracted position and an extended position, and vice versa. In other words, such guide allows the extension and the contraction of the movement device 24 of the collection conveyor 22, which, when arranged in the retracted position, has at least one first section placed above the auxiliary platform 21 within the lateral size of the latter, and a second section emerging outside the lateral size of the auxiliary platform 21. The movable guide 17b of the auxiliary conveyor 15, in the extended position, is then configured to arrange the movement device 16 of the auxiliary conveyor 15 in a position close to the collection conveyor 22 as shown in FIG. 3, while, when in the retracted position, it is configured to arrange the movement device 16 of the auxiliary conveyor 15 in a spaced position with respect to the collection conveyor 22 as shown in FIG. 2. In other words, the movement device 16 of the auxiliary conveyor 15, in the extended position of the movable guide 17b of the auxiliary conveyor 15, has a distance from the collection conveyor 22 lower than a same distance present when the movable guide 17b of the auxiliary conveyor 15 is in the retracted position. When the auxiliary conveyor 15 is arranged in the extended position, the movement device 16 is configured to exchange sleepers T with the collection conveyor 22 at least when the latter is arranged in the second position in which the collection conveyor 22 and the auxiliary conveyor 15 are aligned with each other (see FIG. 3).

The collection conveyor 22 may comprise an extraction motor connected to the movement device 24 and configured to cause the movement thereof with respect to the auxiliary platform 21 from the extended position to the retracted position and vice versa.

The collection conveyor may also be vertically movable along an axis substantially perpendicular to the auxiliary platform 21 between a lowered position and a raised position, as described above in relation to the movement device 16 of the auxiliary conveyor 15.

Figure 8:
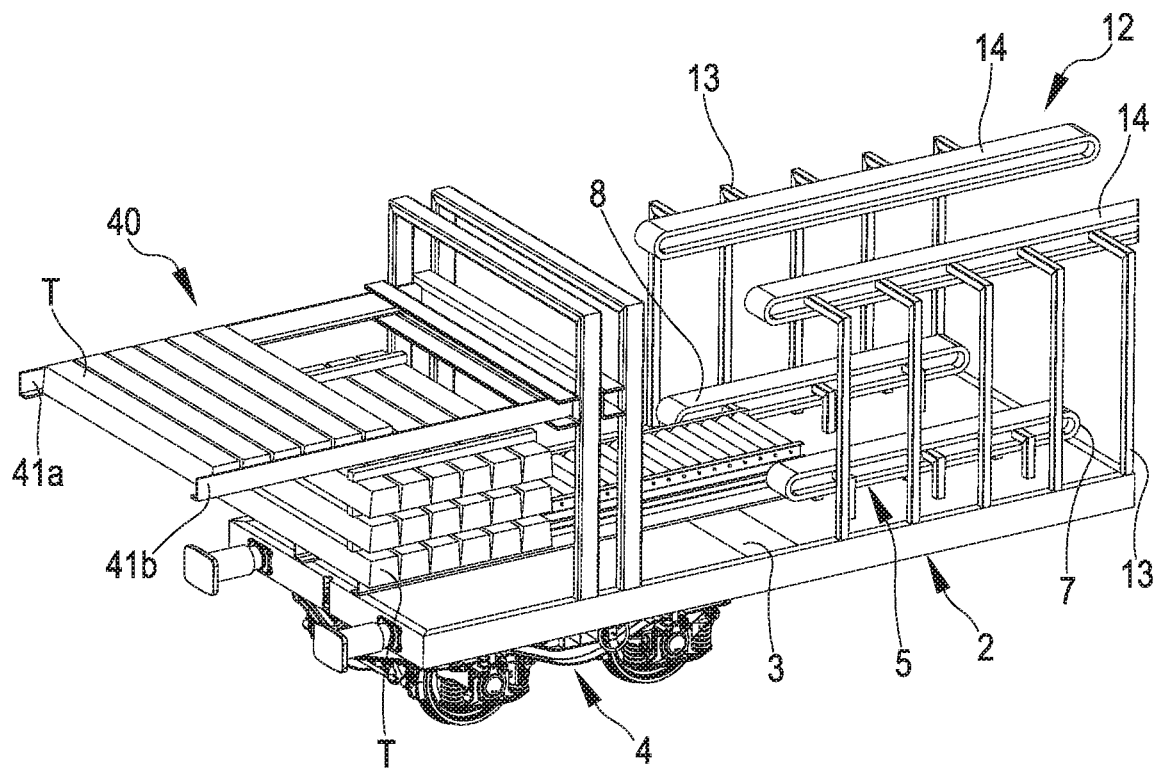
FIG. 8 is a perspective view of a railway wagon during a step of loading the sleepers.
Figure 9:
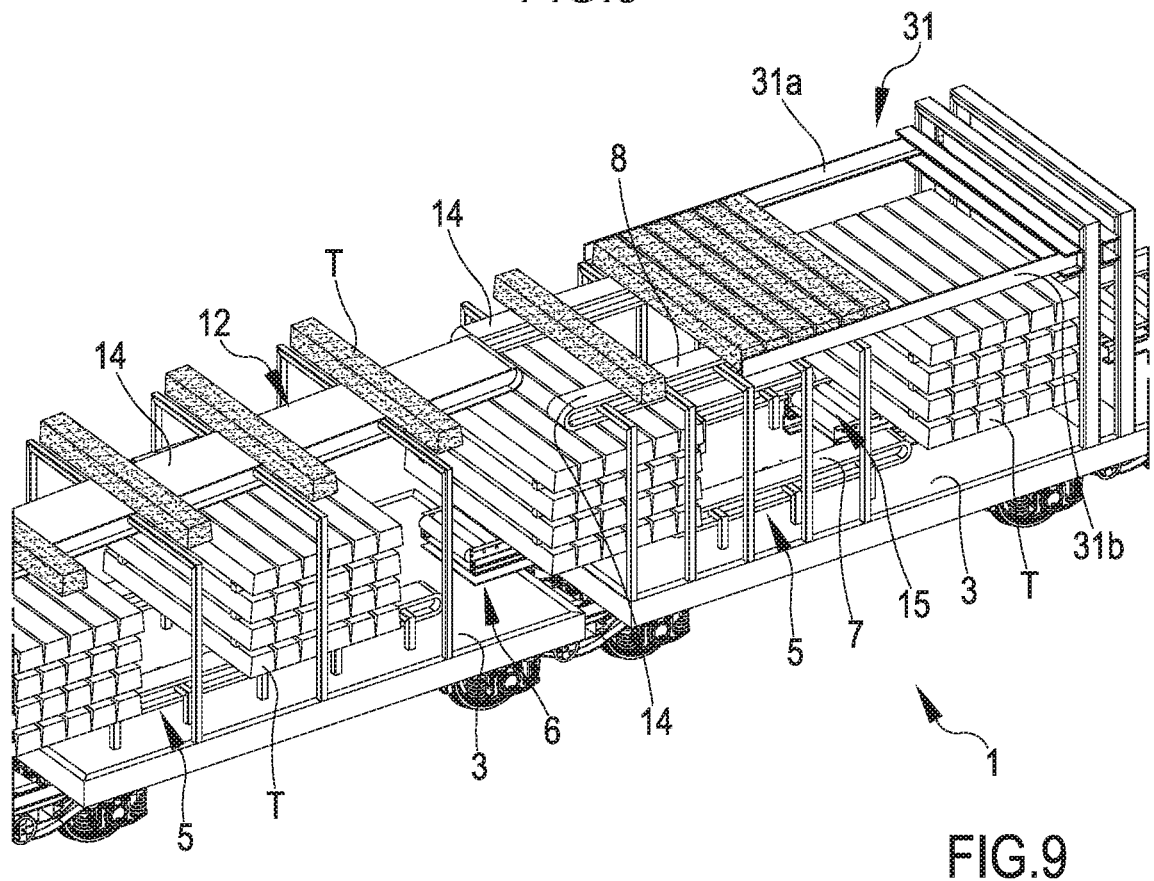
FIGS. 9 to 11 schematically illustrate a railway vehicle during steps of removing (picking up) old sleepers and supplying new sleepers.

The railway wagon 1 may also comprise, as shown in FIGS. 1 and 8, an unloading device 40 configured to receive a predetermined number of sleepers T arriving from the first and from the second conveyor 5, 6, in order to unload them from the railway wagon 1. In particular, the unloading device 40 is configured to unload such sleepers on the railway ballast, for example during works of maintenance or remaking of the railway ballast itself. The unloading device 40 preferably comprises a first and a second grip member 41a, 41b extended along a direction substantially parallel to the prevalent development direction of the platform 3 and of the advancement direction A of the sleepers T, to define a support surface for the sleepers T. The first and the second grip member 41a, 41b are parallel to each other and spaced by a height substantially equal to a lengthwise extension of the sleepers T. The grip members 41a, 41b of the unloading device 40 are also vertically movable along a direction substantially perpendicular to a plane lying along the platform 3 between a lowered position, in which the grip members 41a, 41b are placed at the level of the railway ballast and configured for depositing one or more sleepers T on the ground, a middle position in which the grip members 41a, 41b are coplanar to the first conveyor 5 and configured to receive the sleepers T arriving from the first and from the second conveyor 5, 6. In particular, the grip members 41a, 41b, when arranged in the lowered position, have a distance from the ground that is lower than the same distance measured when the grip members 41a, 41b are arranged in the middle position.

The grip members 41 are also movable height wise up to a raised position, in which the grip members are arranged at a height level measured from the platform 3 greater than a same height measured when the grip members 41 are arranged in the middle or lowered position. The grip members 41, when arranged in the raised position are configured to transfer the sleepers T, in particular the worn sleepers T collected from the railway ballast, to the return conveyor 12.

Figure 7:
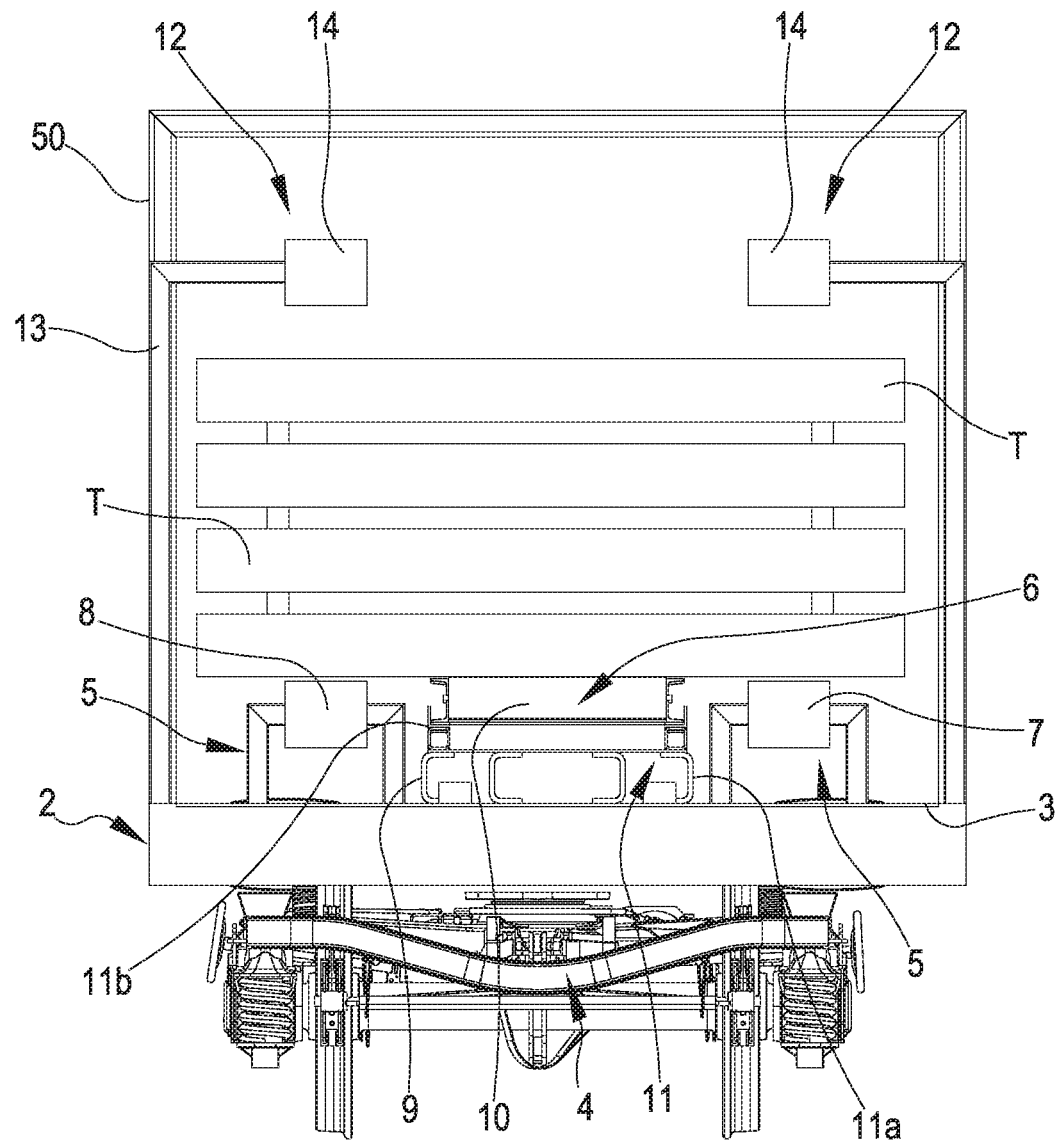
FIG. 7 is a front view of a railway wagon.

The railway wagon 1 may also comprise a cover 50 shown in FIG. 7 preferably made of metallic material, e.g. steel sheet metal, or made of plastic or composite material. The cover 50 emerges height wise from perimeter portions of the platform 3 up to a top to define an external protection at least of the platform 3 and of the first and second conveyors 5, 6.

The railway wagon 1 comprises or is associable with a control unit configured to control at least the first and the second conveyor 5, 6. In particular, the control unit is connected to the drive motor of the first conveyor 5, in particular of the first and of the second movement device 7, 8 of the first conveyor 5, and configured to cause the activation and stopping thereof. Furthermore, the control unit is configured to drive the speed of the drive motor in order to regulate the movement speed of the sleepers T along the advancement direction A when they are carried by the first conveyor 5.

The control unit is also connected to the drive motor of the movement device 10 of the second conveyor 6 and configured to cause the activation and stopping thereof. Furthermore, the control unit is configured to control the speed of the drive motor in order to regulate the movement speed of the sleepers T along the prevalent development direction of the second conveyor 6 when arranged on the latter.

The control unit is also connected to at least one from between the lifting motor, the rotation actuator and the extension motor of the movement device 10 of the second conveyor 6, in order to cause the activation and the stopping respectively of the vertical movement, of the rotation and of the movement between the retracted position and the extended position (and vice versa) of the movement device 10 of the second conveyor 6.

The control unit may also be connected to the drive motor of the movement device 14 of the return conveyor 12 and configured to cause the activation and stopping thereof. Furthermore, the control unit is configured to control the speed of the drive motor in order to regulate the movement speed of the sleepers T along the return direction R.

The control unit 60 may be connected to the lifting motor of the unloading device 40 and configured to cause the activation and stopping thereof; the control unit 60 is configured to control the speed of the lifting motor in order to regulate the lifting or lowering speed of the sleepers T along the vertical direction.

The control unit may also be connected to at least one from between the extraction motor and the lifting motor of the stacked device 30; the control unit is configured to cause, for each motor, the activation and the stopping and to regulate the speed thereof.

In one embodiment comprising the auxiliary conveyor 15, the control unit is connected to at least one from between the drive motor, the lifting motor and the extraction motor; the control unit is configured to cause, for each motor, the activation and the stopping and optionally in order to control the speed thereof.

In one embodiment comprising the collection conveyor 22, the control unit is connected to at least one from between the drive motor, the rotation motor and the extraction motor; the control unit is configured to determine, for each motor, the activation and the stopping and optionally in order to control the speed thereof.

The control unit is then configured to synchronize the activation and the stopping of the motors/actuators present on the railway wagon 1 in order to allow the movement of the sleepers T along the railway wagon itself along the advancement direction A and along the return direction R. In particular, in one embodiment in which the railway wagon 1 includes the platform 3, the carriages 4, the first conveyor 5 and the second conveyor 6, the control unit is configured to:

activate the drive motor of the first conveyor 5 to move the sleepers on the first conveyor 5 along the advancement direction A towards the second conveyor 6;

arrange the second conveyor 6 in the lowered position by means of the activation of the lifting motor of the second conveyor 6;

arrange the second conveyor 6 in the retracted position, by means of the activation of the extraction motor of the second conveyor 6, in order to allow the transfer of the sleepers from the first to the second conveyor 5, 6;

arrange the movement device 10 of the second conveyor 6 in the first position, in particular align the prevalent development direction of the movement device 10 of the second conveyor 6 with the prevalent development direction D of the platform 3;

active the drive motor of the movement device 10 of the second conveyor 6 in order to cause the movement of the sleepers T along the advancement direction A;

evaluate by means of a sensor, for example by means of a weight sensor or an optical sensor, the presence of the sleepers on the second conveyor 6;

when the sleepers T are arranged on the movement device 10 of the second conveyor 6, arranging the second conveyor 6 in the raised position by means of the activation of the lifting motor of the second conveyor 6;

optionally estimate the angular tilt existing between the prevalent development direction D of the platform 3 of the railway wagon 1 and the respective prevalent development direction D' of a further associated railway wagon;

determine, as a function of such tilt, the rotation of the movement device 10 of the second conveyor 6 around an axis substantially perpendicular to the platform 3, in a manner such to align the prevalent development direction of the movement device 10 with the prevalent development direction of the further railway wagon;

arrange the second conveyor 6 in the extended position by means of the activation of the extraction motor of the second conveyor 6, in order to cause the interposition of the second end portion 6b of the second conveyor 6 between the first and the second movement device 7, 8 of the further railway wagon associated with the railway wagon 1;

arrange the movement device 10 of the second conveyor 6 in the lowered position by means of the activation of the lifting motor of the second conveyor 6 in order to allow depositing the sleepers T on the first conveyor 5 of the further railway wagon.

In one embodiment in which the railway wagon 1 also comprises the auxiliary platform 21, the collection station 20 and the auxiliary conveyor 15, the control unit is further configured to:

arrange, in the first position, the movement device 24 of the collection conveyor 22 by means of the activation of the rotation motor of the collection conveyor 22;

evaluate by means of a sensor, e.g. a weight sensor or optical sensor, the presence of sleepers T on the collection conveyor 22;

arrange in the lowered position the movement device 16 of the auxiliary conveyor 15 by means of the activation of the lifting motor of the auxiliary conveyor 15;

arrange in the second position the movement device 24 of the collection conveyor 22;

arrange the auxiliary conveyor 15 in the extended position by means of the activation of the extraction motor;

activate the drive motor of the movement device 24 of the collection conveyor 22 and the drive motor of the auxiliary conveyor 15 in order to cause the movement of the sleepers T from the collection station 20, through the auxiliary conveyor 15, towards the first conveyor 5 along the advancement direction A; and arrange the auxiliary conveyor 15 in the retracted position by means of the activation of the extraction motor.

In an operative condition of the railway wagon, during the passage of the sleepers T from the auxiliary conveyor 15 to the first conveyor 5, the control unit may be configured to arrange the auxiliary conveyor 15 in the raised position until at least part of the sleepers T are arranged above the first conveyor 5 and spaced height-wise from the latter.

In one embodiment in which the railway wagon 1 also comprises the unloading device 40, the return conveyor 12 and the stacked device 30, the control unit is further configured to:

arrange the unloading device 40 in the middle position by means of the activation of the lifting motor, in a manner such to arrange a predetermined number of sleepers on the grip members 41 of the unloading device 40;

arrange the unloading device 40 in the lowered position by means of the activation of the lifting motor, in a manner such to unload a predetermined number of new sleepers T on the railway ballast;

arrange the unloading device 40 in the raised position by means of the activation of the lifting motor, in a manner such to allow the transfer of a predetermined number of sleepers T on the return conveyor 12;

determine the movement of the return conveyor 12 by means of the activation of the drive motor in order to allow the movement of the worn sleepers T along the return direction R;

arrange the stacked device 30 in the raised position by means of the activation of the lifting motor in order to receive a predetermined number of worn sleepers T from the return conveyor 12;

move the stacked device 30 into the lowered position by means of the activation of the lifting motor in order to arrange said predetermined number of worn sleepers T on the movement device 16 of the auxiliary conveyor 15;

move the movement device 16 of the auxiliary conveyor 15 by means of the activation of the drive motor in order to cause the movement of the predetermined number of worn sleepers T from the auxiliary conveyor 15 to the collection station 20.

Railway Vehicle

A railway vehicle 100 is usable for renovating railway lines and comprises a plurality of railway wagons 1, in which at least one railway wagon 1 is in accordance with the above-described and/or claimed wagon 1.

In a first embodiment, the vehicle 100 may comprise at least one first railway wagon 1a comprising the platform 3, the at least one carriage 4, the first conveyor 5 and the second conveyor 6, and a second railway wagon 1b comprising at least the platform 3, the first conveyor 5 and the unloading device 40. In such configuration, the second conveyor 6 defines a bridge between the first and the second railway wagon 1a, 1b in a manner such to allow the movement of the sleepers T from the first conveyor 5 of the first wagon 1a to the first conveyor 5 of the second wagon 1b.

In a second embodiment, the first wagon 1a also comprises the auxiliary platform 21, the auxiliary conveyor 15 and the collection station 20, as shown in FIG. 1.

In one embodiment shown in FIG. 1, the vehicle 100 comprises at least two railway wagons; in particular, said railway vehicle 100 comprises:

a first tail wagon comprising the platform 3, the first conveyor 5, the second conveyor 6, the auxiliary platform 21, the auxiliary conveyor 15 and the collection station 20; and a head wagon comprising the platform 3, the first conveyor 5 and the unloading device 40.

It is useful to observe that the railway vehicle 100 may comprise a plurality of middle wagons, in accordance with the above-reported description with reference to the first railway wagon 1, interposed between the tail wagon and the head wagon, comprising the platform 3, the first conveyor 5 and the second conveyor 6.

In an embodiment variant, at least one middle wagon may comprise the platform 3, the first conveyor 5 and two second conveyors 6 opposite each other and respectively arranged at the first and second end portions 3a, 3b of the loading platform 3.

The vehicle 100 may be employed for remaking the railway ballast, in which it is necessary to remove from the ballast the sleepers T that are worn or damaged and substitute them with analogous new sleepers T. On such matter, the vehicle 100 provides for the loading of new sleepers T, shown in the enclosed drawings in white, at the collection station 20 in order to move them by means of the first and the second conveyors 5, 6 along the plurality of railway wagons up to the unloading device 40, in a manner such to allow the deposit thereof on the railway ballast. The worn sleepers T, shown in the enclosed drawings covered with dots, are then removed and moved by means of the same unloading device 40 towards the return conveyor 12, which causes the movement thereof up to the collection station 20 in order to allow the subsequent unloading thereof.

Process for Moving Sleepers

A process for moving sleepers for making or renovating railway lines.

The process provides for comprising a first step of loading sleepers (new sleepers to be installed or to be substituted in place of old sleepers) on a railway wagon 1, for example a tail wagon, by means of the collection station. The sleepers loaded on the tail railway wagon are initially placed on the auxiliary platform and by means of the auxiliary conveyor they are moved on the first conveyor. The first conveyor 5 moves the sleepers along the longitudinal extension of the tail wagon 1 up to a second conveyor 6 of the same wagon. The second conveyor 6 is at the time angularly aligned (parallel) with the first conveyor 5 of the tail wagon when it receives the sleepers; the second conveyor extends outside the lateral size of the tail wagon and moves the sleepers received from the first conveyor outside said tail wagon up to serving said sleepers to a first conveyor of an adjacent railway wagon, for example an intermediate wagon.

The intermediate railway wagon also has the platform, the first conveyor 5 and the second conveyor 6; the intermediate wagon which receives the sleepers moves them along the extension thereof by means of the first conveyor 5 away from the tail wagon, up to serving the second conveyor 6 thereof. The second conveyor 6 of the intermediate railway wagon 1 moves the sleepers outside the lateral size of the railway wagon in order to serve an adjacent railway wagon and in particular a first conveyor 5 of the adjacent railway wagon.

The process may provide for the movement of sleepers through a plurality of intermediate railway wagons up to reaching a first conveyor 5 of a head railway wagon 1.

The head railway wagon 1 comprises the platform, the first conveyor 5 and the unloading device. The sleepers that reach the unloading device are unloaded from the railway vehicle 100.

The process may also provide for the recovery of old sleepers from pre-existing railway lines; the old sleepers are initially loaded on the return conveyor 12 that is raised with respect to the conveyors 5 and 6 of the vehicle. The conveyor moves the old sleepers from the head railway wagon 1, through the intermediate railway wagons, up to the tail railway wagon 1 where the old sleepers are unloaded from the vehicle.

The present invention may be embodied to provide advantages. In particular, due to the presence of the second conveyor 6 movable by rotation, it allows the movement of the sleepers T between one railway wagon and the next even when the wagons are tilted with respect to each other.

The present invention may be embodied to allow a quick and continuous movement of the sleepers along the railway wagons without having to interrupt their movement if the wagons are tilted with respect to each other, which occurs if the wagons are arranged on a curve along a railway: this determines a substantial increase of speed during the work operations for repairing or maintaining the railway ballast.

Furthermore, the present finding has a simple, compact and therefore light structure; the wagon and the railway vehicle have an improved load capacity with respect to the preceding solutions. It is also indicated that the simple and compact structure positively affects the production costs and also allows minimizing the costs for possible repair and maintenance interventions.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A railway wagon for moving sleepers including a base structure comprising:
    a platform extending longitudinally along a prevalent development direction between a first end portion of the platform and a second end portion of the platform,
    a carriage configured to support the platform and allow the base structure to move along rails,
    a first conveyor carried by the platform and configured to move sleepers relative to said platform along an advancement direction parallel to the prevalent development direction,
    a second conveyor, distinct from the first conveyor, carried by the platform, said second conveyor including:
        a first portion located above the platform within a lateral size of the platform, said first portion of the second conveyor configured for the exchange of the sleepers with the first conveyor, and
        a second portion extending outside a lateral size of the platform and configured to move the sleepers outside said platform, and
        a movement device movable by rotation relative to the platform around an axis transverse to said platform,
    wherein the second conveyor is at the second end portion of the platform, and the second portion of the second conveyor emerges from the second end portion of the platform,
    wherein the first conveyor extends longitudinally along the prevalent development direction,
    wherein the movement device of the second conveyor extends longitudinally along the prevalent development direction,
    wherein the second conveyor comprises:
        an actuator active on the movement device of the second conveyor and configured to rotate said movement device between a first position and a second position,
        an angular sensor configured to emit a signal representative of an angular displacement between the railway wagon and an adjacent railway wagon with respect to the advancement direction, and
        a control unit communicating with the actuator and the angular sensor, the control unit being active on said actuator and configured to:
            receive from the angular sensor the signal representative of the angular displacement between the railway wagon and an adjacent railway wagon with respect to the advancement direction, and
            as a function of said signal, command the actuator to rotate the movement device of the second conveyor between the first position and the second position.

2. The railway wagon according to claim 1, wherein the first conveyor extends longitudinally between a first end portion and a second end portion of the first conveyor, and
    wherein at least part of the first portion of the second conveyor is flanked by at least part of the second end portion of the first conveyor.

3. The railway wagon according to claim 1, wherein the first conveyor comprises a first movement device and a second movement device spaced apart from the first movement device along a direction orthogonal to the advancement direction, and
    wherein at least part of the first portion of the second conveyor is interposed between said first movement device and the second movement device.

4. The railway wagon according to claim 1, wherein the second conveyor comprises a base fixed to the platform, wherein the movement device is engaged to the base and movable relative to the platform,
    wherein the movement device of the second conveyor is movable by rotation relative to the base around an axis transverse to the platform.

5. The railway wagon according to claim 4, wherein the movement device of the second conveyor is movable towards and away from the base of the second conveyor along a direction orthogonal to the advancement direction of the platform.

6. The railway wagon according to claim 5, wherein the first conveyor includes a first movement device and a second movement device, and the first movement device is spaced from the second movement device along a direction orthogonal to the advancement direction,
    wherein the first movement device defines a first supporting surface configured to receive said sleepers,
    wherein the movement device of the second conveyor defines a second supporting surface configured to receive said sleepers, said movement device of the second conveyor is movable towards and away from the base at least between:
        a lowered position, in which the second supporting surface is coplanar to the first supporting surface, and
        a raised position, in which the second supporting surface is elevated with respect to the first supporting surface.

7. The railway wagon according to claim 1, wherein the first conveyor comprises a drive motor configured for determining the movement of the sleepers along the advancement direction,
wherein the second conveyor comprises:
a respective drive motor configured for determining the movement of the sleepers along the advancement direction,
a lifting motor configured for causing the movement of the movement device of said second conveyor from the lowered position to the raised position, and vice versa,
an extraction motor configured to cause the movement of the movement device between the retracted position and the extended position, and vice versa,
a rotation actuator configured for causing a rotation of the movement device around from the first to the second position,
wherein the railway wagon further comprises a control unit connected to the drive motors of the first and second conveyors, the lifting motor, the extraction motor and the rotation actuator,
wherein the control unit is configured to:
activate the drive motor of the first conveyor to move the sleepers on the first conveyor along the advancement direction towards the second conveyor;
arrange the second conveyor in the lowered position by means of the activation of the lifting motor of the second conveyor;
arrange the second conveyor in the retracted position, by means of the activation of the extraction motor of the second conveyor, in order to allow the transfer of the sleepers from the first to the second conveyor;
arrange the movement device of the second conveyor in the first position, aligning the prevalent development direction of the movement device of the second conveyor with the prevalent development direction of the platform;
active the drive motor of the movement device of the second conveyor in order to cause the movement of the sleepers along the advancement direction;
evaluate by means of a sensor the presence of the sleepers on the second conveyor;
when the sleepers are arranged on the movement device of the second conveyor, arranging the second conveyor in the raised position by means of the activation of the lifting motor of the second conveyor;
estimate the angular tilt existing between the prevalent development direction of the platform of the railway wagon and the respective prevalent development direction of a further associated railway wagon;
determine, as a function of such tilt, the rotation of the movement device of the second conveyor around an axis substantially perpendicular to the platform, in a manner such to align the prevalent development direction of the movement device with the prevalent development direction of the further railway wagon;
arrange the second conveyor in the extended position by means of the activation of the extraction motor of the second conveyor; and
arrange the movement device of the second conveyor in the lowered position by means of the activation of the lifting motor of the second conveyor in order to allow depositing the sleepers on the first conveyor of the further railway wagon.

8. A railway wagon for moving sleepers including a base structure comprising:
at least one platform,
at least one carriage configured to support the platform and allow the base structure to move along rails,
at least one first conveyor carried by the platform and configured to move sleepers relative to said platform along an advancement direction,
at least one second conveyor, distinct from the first conveyor, carried by the platform, said second conveyor having:
at least one first portion located above the platform within a lateral size of the platform, said first portion of the second conveyor configured to exchange the sleepers with the first conveyor, and
at least one second portion extending outside the lateral size of the platform and configured to move the sleepers outside said platform,
wherein the second conveyor comprises at least one movement device movable by rotation relative to the platform around an axis transverse to said platform,
wherein the platform extends longitudinally along a prevalent development direction between a first end portion and a second end portion of the platform,
wherein the second conveyor is at the second end portion of the platform, the second portion of the second conveyor extends beyond the second end portion of the platform,
wherein the second conveyor comprises at least one guide device interposed between the movement device and the base of the second conveyor, wherein said guide device comprises:
a fixed guide engaged to the base by means of a constraint of hinge type, and
a movable guide carrying said movement device and slidably movable with respect to the fixed guide at least between:
a retracted position, in which the movement device, carried by said movable guide, is placed in proximity to the first conveyor, and
an extended position, in which the movement device, carried by said movable guide, is spaced apart from the first conveyor.

9. The railway wagon according to claim 8, wherein the fixed guide is movable by rotation with respect to the base around an axis orthogonal to the platform.

10. The railway wagon according to claim 9, wherein the movable guide is integral with the fixed guide in the rotation around the axis orthogonal to the platform.

11. The railway wagon according to claim 8, wherein the fixed guide is movable by rotation with respect to the base around an axis orthogonal to the platform, wherein the movable guide is integral with the fixed guide in the rotation around the axis orthogonal to the platform.

12. The railway wagon according to claim 11, wherein the movement device of the second conveyor, in the retracted position, has:
at least one first section located above the platform within the lateral size of the platform, and
at least one second section extending outside the lateral size of the platform to define said second portion of the second conveyor,
wherein the movement device of the second conveyor, in the extended position of the movable guide, extends entirely outside the lateral size of the platform.

13. The railway wagon according to claim 12, wherein the first section of the movement device of the second conveyor, in the retracted position of the movable guide, is at least partly flanked to the second end portion of the first conveyor.

14. A railway wagon for moving sleepers comprising a base structure having:
- at least one platform,
- at least one carriage configured to support the platform and allow the base structure to move along rails,
- at least one first conveyor carried by the platform and configured to move the sleepers relative to said platform along an advancement direction,
- at least one second conveyor, distinct from the first conveyor, carried by the platform, said second conveyor having at least one first portion located above the platform within a lateral size of the platform, said first portion of the second conveyor being configured for the exchange of sleepers with the first conveyor, and at least one second portion extending outside the lateral size of the platform and configured to move the sleepers outside said platform,
- wherein the second conveyor comprises at least one base fixed to the platform and at least one movement device engaged to the base and movable relative to the platform,
- wherein the second conveyor comprises at least one guide device interposed between the movement device and the base of the second conveyor, wherein said guide device comprises:
- a fixed guide engaged with the base,
- a movable guide carrying said movement device and slidably movable with respect to the fixed guide at least between:
- a retracted position in which the movement device, carried by said movable guide, is placed in proximity to the first conveyor, and
- an extended position in which the movement device, carried by said movable guide, is spaced apart from the first conveyor.

15. The railway wagon according to claim 14, wherein the movement device of the second conveyor, in the extended position of the movable guide, extends entirely outside the lateral size of the platform.

* * * * *